United States Patent [19]

Watanabe et al.

[11] Patent Number: 5,087,673

[45] Date of Patent: Feb. 11, 1992

[54] PROCESS FOR PRODUCTION OF CHLORINATED ETHYLENE-PROPYLENE COPOLYMERS

[75] Inventors: Naotoshi Watanabe; Tsuyoshi Masukawa, both of Kanagawa; Kenji Ozaki, Yokohama, all of Japan; Noboru Moriwaki, Jurong, Singapore

[73] Assignee: Showa Denko K.K., Tokyo, Japan

[21] Appl. No.: 683,530

[22] Filed: Apr. 9, 1991

Related U.S. Application Data

[63] Continuation of Ser. No. 122,717, Nov. 18, 1987, abandoned.

[30] Foreign Application Priority Data

| Nov. 18, 1986 | [JP] | Japan | 61-273000 |
| Nov. 18, 1986 | [JP] | Japan | 61-273002 |
| Nov. 18, 1986 | [JP] | Japan | 61-273004 |
| Dec. 18, 1986 | [JP] | Japan | 61-300159 |
| Dec. 18, 1986 | [JP] | Japan | 61-300160 |
| Dec. 18, 1986 | [JP] | Japan | 61-300161 |
| Mar. 23, 1987 | [JP] | Japan | 62-65806 |

[51] Int. Cl.$^5$ .............................. C08F 8/20
[52] U.S. Cl. ................... 525/356; 525/334.1; 525/358
[58] Field of Search ............ 525/334.1, 356, 358

[56] References Cited

U.S. PATENT DOCUMENTS

| 3,192,188 | 6/1965 | Orthner et al. | 525/356 |
| 3,759,888 | 11/1970 | Nose et al. | 525/358 |
| 3,935,181 | 1/1976 | Schoen | 260/94.9 H |
| 4,547,554 | 10/1985 | Kadomatsu et al. | 525/334.1 |

FOREIGN PATENT DOCUMENTS

| 1441636 | 7/1976 | Canada. |
| 0184212 | 6/1986 | European Pat. Off.. |
| 0145703 | 8/1983 | Japan | 525/334.1 |

OTHER PUBLICATIONS

CHEMICAL ABSTRACTS, Vol. 101, No. 20, Nov. 1984, p. 76, Astract No. Abstract No. 172840u.
CHEMICAL ABSTRACTS, Vol. 100, No. 12, Mar. 1984, p. 63, Abstract No. 87032s.
CHEMICAL ABSTRACTS, Vol. 100, No. 8, Feb. 1984, p. 17, Abstract No. 52244k.

Primary Examiner—Paul R. Michl
Assistant Examiner—John T. Guarriello
Attorney, Agent, or Firm—Sughrue, Mion, Zinn, Macpeak & Seas

[57] ABSTRACT

A chlorinated ethylene-propylene copolymer having a chlorine content of 20 to 45% by weight and a Mooney viscosity ($ML_{1+4}$, 100° C.) of 10 to 150 is produced by chlorinating in two or three stages, by contact with chlorine gas in an aqueous suspension, an ethylene-propylene copolymer having a propylene content of 15 to 40% by weight, a melt flow index of 0.01 to 5.0 g/10 minutes, a melting peak as measured by differential scan calorimeter (DSC) of 80° C. or more, a crystallinity as measured by X-rays of 3% or more, an index $\overline{M}_W/\overline{M}_N$ of the distribution of molecular weight, determined by gel permeation chromatography (GPC), of greater than 4, and a Mooney visocisty ($ML_{1+4}$, 100° C.) of 10 to 180.

A vulcanizable composition having superior physical properties may be obtained by formulating with (A) the chlorinated ethylene-propylene copolymer, (B) a thiourea compound, (C) sulfur and/or a sulfur donor, (D) a metal compound, and furthur, if necessary, (E) a dicarbamate or (F) a mercaptotriadizine compound. Furthur, a cross-linkable composition having superior physical properties may be obtained by formulating (A) the chlorinated ethylene-propylene copolymer with (G) an organic peroxide.

7 Claims, 5 Drawing Sheets

PROCESS FOR PRODUCTION OF CHLORINATED ETHYLENE-PROPYLENE COPOLYMERS

This is a continuation of application Ser. No. 07/122.717, filed Nov. 18, 1987, now abandoned.

BACKGROUND OF THE INVENTION

1. Field of the Invention

The present invention relates to a process for the production of chlorinated ethylene-propylene copolymers by chlorinating ethylene-propylene copolymers in an aqueous suspension. More specifically, it relates to a process for the production of chlorinated ethylene-propylene copolymers which are not only excellent in heat resistance and cold resistance, but are also excellent in oil resistance and, further, are excellent in weather resistance and ozone resistance and can not only be cross-linked, but are also relatively easily vulcanized.

The present invention also relates to chlorinated ethylene-propylene copolymer compositions with excellent vulcanization ability and cross-linking ability. More specifically, it relates to chlorinated ethylene-propylene copolymer compositions comprised of (A) chlorinated ethylene-propylene copolymers, (B) thiourea compounds, (C) sulfur and/or sulfur donors, (D) metal compounds acting as acid accepting agents, and, in some cases, (E) dithiocarbamates or mercaptotriazinic compounds, which compositions are not only excellent in vulcanization ability, but also are excellent in flexibility and compression set and further are excellent in heat resistance.

The present invention further relates to chlorinated ethylene-propylene copolymer compositions with excellent cross-linking ability comprised of (A) chlorinate ethylene-propylene copolymers and (G) organic peroxides, which compositions are not only excellent in cross-linking ability, but also excellent in flexibility and compression set and further are excellent in heat resistance.

2. Description of the Related Art

Chlorinated ethylene-propylene copolymers are generally excellent in oil resistance, flame retardance, etc. so are useful as paints and adhesives, as has been known in the past (see Japanese Unexamined Patent Publication (Kokai) No 59-122503). As the process for chlorinating ethylene-propylene copolymers, there is the process wherein ethylene-propylene copolymers are chlorinated in an aqueous medium not containing a suspending agent at a first stage at less than 50° C., for example, 20° to 45° C., until 2% by weight or more, for example, 2 to 15% by weight, then the temperature raised to 50° C. or more, for example, 70° to 100° C., at a second stage, and chlorination performed at that temperature until a chlorine content of 18% by weight or more, for example, 18 to 50% by weight. Further, there has been. proposed the process wherein ethylene-propylene copolymers are dissolved in a solvent such as, for example, carbon tetrachloride, and the chlorination performed in the solvent at a relatively high temperature, up to 150° C. However, this process involves a high vapor pressure of the solvent in the reaction system and requires high temperature pressure resistant reaction vessels. Further, there are problems in the heat stability of the synthesized polymer. On the other hand, when chlorinating with the above-mentioned aqueous medium, there are problems in that the chlorinated substance agglomerates in the rinsing after the chlorination.

Chlorinated polyethylene, in particular noncrystalline chlorinated polyethylene rubber substances, is chemically saturated in structure and is a chlorine-containing polymer substance, so its cross-linked products (or vulcanized products) are excellent in physical properties such as weather resistance, flame retardance, chemical resistance, electrical properties, and heat resistance. Therefore, it is used in a wide range of industrial fields formed into cable coverings, electrical components, hoses, building materials, auto parts, packing, and sheets.

However, this chlorinated polyethylene differs from general use rubber, for example, rubber principally composed of butadiene, in that it is, as mentioned above, chemically saturated in structure, so is difficult to vulcanize using sulfur or sulfur donors as the vulcanization agent. Therefore, as the cross-linking agent, use is generally made of organic peroxides for the cross-linking. However, when hoses, sheets, tubes, or other products are extruded and then cross-linked using the vulcanization vessels generally used in the rubber industry, it is difficult to obtain the suitably cross-linked product and the resultant cross-linked product is inferior in, for example, tensile strength, heat resistance.

For the above reasons, it has been proposed to vulcanize the substance using sulfur or a sulfur donor (see Japanese Unexamined Patent Publication (Kokai) No. 55-71742). Further, some of the present inventors have previously proposed the formulation into the sulfur or sulfur donor of thiourea compounds, metal salts or dithiocarbamate, and, as an acid accepting agent, magnesium oxide and/or lead oxide so as to obtain a vulcanizable chlorinated polyethylene composition able to be vulcanized and excellent in various mechanical properties such as tensile strength (see Japanese Unexamined Patent Publication (Kokai) No. 61-209244).

However, the composition, as clear from a comparison of the cross-linking curve of FIG. 1, is not always satisfactory in vulcanization ability and, therefore, not sufficient in flexibility and compression set and, further, is inferior in heat resistance.

On the other hand, the process of cross-linking using organic peroxides enables formation of compositions with excellent heat resistance and compression set, but the compositions are poor in cross-linking efficiency so require use of large amounts of organic peroxides or further cross-linking agents in the case of products for which high heat resistance and high compression set are required, leading to increased costs.

SUMMARY OF THE INVENTION

Accordingly, the objects of the present invention are to achieve the above-mentioned desire and to provide a process for the production of chlorinated ethylene-propylene copolymers free from the afore-mentioned problems of the prior art and excellent in heat resistance and cold resistance and, further, excellent in oil resistance, weather resistance, and ozone resistance and, still further, able to be chlorinated at a relatively low temperature, free from agglomeration of the obtained chlorinated substance, and able to be cross-linked by organic peroxides and vulcanized by sulfur or sulfur-containing compounds (i.e., sulfur releasing compounds).

Another object of the present invention is to provide a chlorinated ethylene-propylene copolymer composition, as demanded in the field of chlorinated ethylene-propylene copolymers, which is extremely excellent in vulcanization ability and excellent in tensile resistance and compression set and other mechanical properties and, further, excellent in heat resistance.

A further object of the present invention is to provide a chlorinated ethylene-propylene copolymer which, by addition of a small amount of organic peroxides, is excellent in resistance to high heat, high compression set, and other mechanical properties and can obtain satisfactory required properties at low cost.

Other objects and advantages of the present invention will be apparent from the following description.

In accordance with the present invention, there is provided a method for producing chlorinated ethylene-propylene copolymers by bringing an ethylene-propylene copolymer, wherein the propylene content is 15 to 40% by weight, the melt flow index (measured by ASTM D 1238, condition L, hereinafter referred to as "MFR") is 0.01 to 5.0 g/10 minutes, the melting peak as measured by differential scan calorimeter (DSC) is 100° C. or more, the crystallinity as measured by X-rays is 5% or more, the index of $\overline{M}_W$ (weight average molecular weight) to $\overline{M}_N$ (numerical average molecular weight) of the distribution of molecular weight, determined by gel permeation chromatography (GPC), is greater than 4, and the Mooney viscosity ($ML_{1+4}$, 100° C.) is 10 to 180, into contact with chlorine gas in an aqueous suspension, in which method there is produced a chlorinated ethylene-propylene copolymer having a chlorine content of 20 to 45% by weight and a Mooney viscosity ($ML_{1+4}$, 100° C.) of 10 to 150, wherein at the first stage, 20 to 60% of the total chlorination amount is chlorinated at a temperature at least 25° C. below the melting point of the ethylene-propylene copolymer and higher than 50° C., at the second stage, at least 30% of the remaining chlorination amount is chlorinated at a temperature 10° C. or more higher than the chlorination temperature at the first stage and a temperature 5° to 15° C. lower than the melting point of said ethylene-propylene copolymer, with 60 to 90% of the total chlorination amount chlorinated up to that stage, and at the third stage, the remaining chlorination is performed at a temperature less than the melting point of the ethylene-propylene copolymer but not less than a temperature of the melting point minus 2° C. (i.e., m.p. −2° C.).

In accordance with the present invention, there is further provided a process for production wherein, following the above first stage (i.e., 20 to 60% chlorination), at the second stage, the temperature is raised to 1° to 7° C. higher than the melting point of the ethylene-propylene copolymer, at which temperature annealing is performed for 10 to 60 minutes without introduction of chlorine gas, and at the third stage, at a temperature 2° to 25° C. lower than the melting point of the ethylene-propylene copolymer, particularly at a temperature 30° to 60° C. lower than the melting point of said copolymer, the remaining chlorination is performed.

In accordance with the present invention, there is further provided a process for production wherein, following the above first stage, at the second stage, the remaining chlorination is performed at a temperature 10° C. or more higher than the chlorination temperature of the first stage and a temperature 5° to 15° C. lower than the melting point of the said ethylene-propylene copolymer.

In accordance with the present invention, there is further provided a chlorinated ethylene-propylene copolymer composition comprising (A) 100 parts by weight of a chlorinated ethylene-propylene copolymer having a chlorine content of 20 to 45% by weight and a Mooney viscosity ($ML_{1+4}$, 100° C.) of 10 to 150 obtained by chlorinating an ethylene-propylene copolymer wherein the propylene content is 15 to 40% by weight, the melt flow index (MFR) is 0.01 to 5.0 g/10 minutes, the melting peak as measured by differential scan calorimeter (DSC) is 80° C. or more, the crystallinity as measured by X-rays is 3% or more, the index of $\overline{M}_W/\overline{M}_N$ of the distribution of molecular weight, determined by gel permeation chromatography (GPC), is greater than 4, and the Mooney viscosity ($ML_{1+4}$, 100° C.) is 10 to 180, (B) 1.0 to 10.0 parts by weight of a thiourea compound represented by the general formula (I):

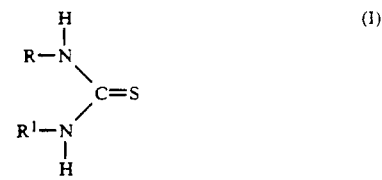

wherein, R and $R^1$, which may be the same or different, are hydrocarbon groups of at most 18 carbon atoms, (C) 0.1 to 10.0 parts by weight of sulfur and/or a sulfur donor, (D) 1.0 to 15.0 parts by weight of a metal compound acting as an acid accepting agent, and, in some cases, (E) 0.05 to 5.0 parts by weight or dithiocarbamate or (F) 0.01 to 2.0 parts by weight of a mercaptotriazine compound of the general formula (II).

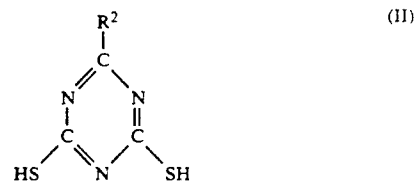

wherein $R^2$ is a mercapto or amino group.

In accordance with the present invention, there is further provided a composition composed of (A) 100 parts by weight of the afore-mentioned chlorinated ethylene-propylene copolymer plus (G) 0.1 to 10.0 parts by weight of organic peroxide.

In the graph, the vertical axis shows the torque (kg·cm) and the horizontal axis the vulcanization time (minutes). Note that a-1 and b-1 are the vulcanization curves of the compositions obtained by Reference Example 1 and Reference Example 2.

Figure 2:
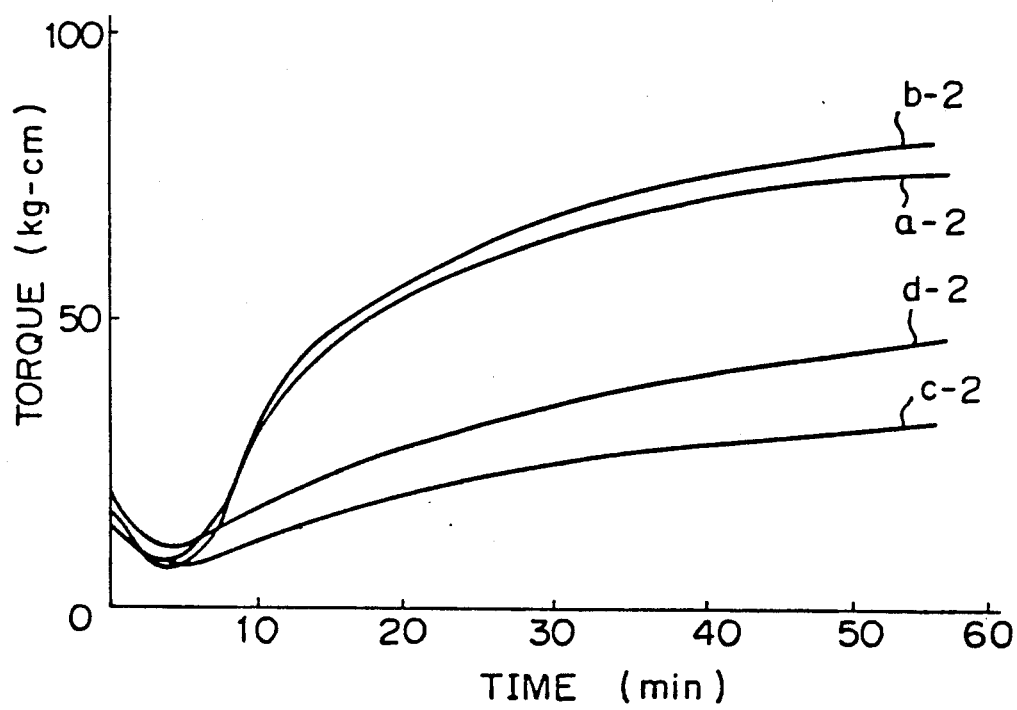

FIG. 2 is a graph of cross-linking, measured using a Disc Rheometer, of compositions obtained by Examples IV-1 and IV-5 and Comparative Example IV-1 and IV-8. In the graph, the vertical axis shows the torque (kg·cm) and the horizontal axis the cross-linking time (minutes). Note that a-2, b-2, c-2, and d-2 respectively show the cross-linking curves of the compositions obtained by Example IV-1, Example IV-5, Comparative Example IV-1, and Comparative Example IV-8.

Figure 3:
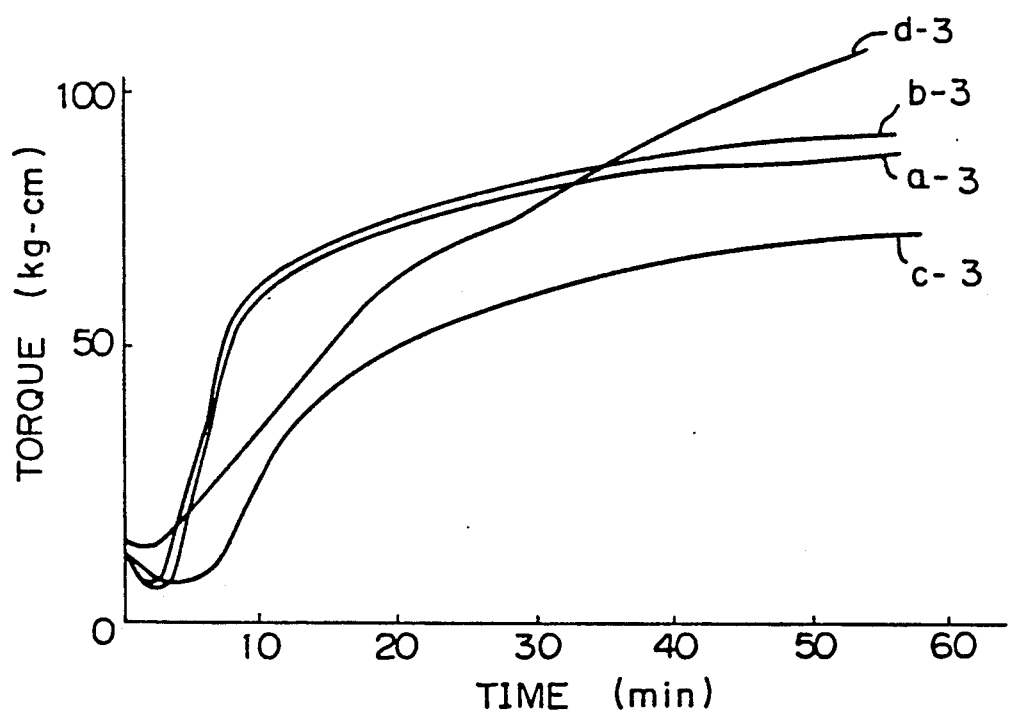

FIG. 3 is a graph of cross-linking, measured using a Disc Rheometer, of compositions obtained by Examples V-1 and V-5 and Comparative Examples V-1 and V-9. In the graph, the vertical axis shows the torque (kg·cm) and the horizontal axis the cross-linking time (minutes). Note that a-3, b-3, c-3, and d-3 respectively show the cross-linking curves of the compositions obtained by Examples V-1 and V-2 and Comparative Examples V-1 and V-9.

Figure 4:
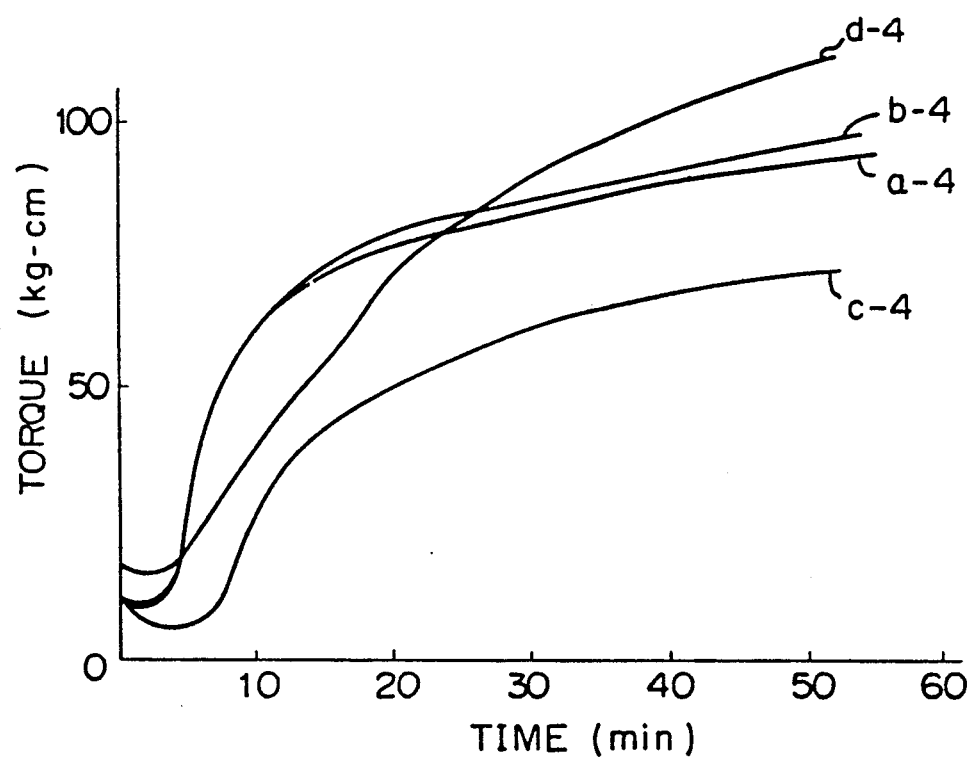

FIG. 4 is obtained from Examples VI-1 and VI-3 and Comparative Examples VI-1 and VI-11.

Note that a-4, b-4, c-4, and d-4 show cross-linking curves of compositions obtained by Examples VI-1 and VI-3 and Comparative Examples VI-1 and VI-11.

Figure 5:
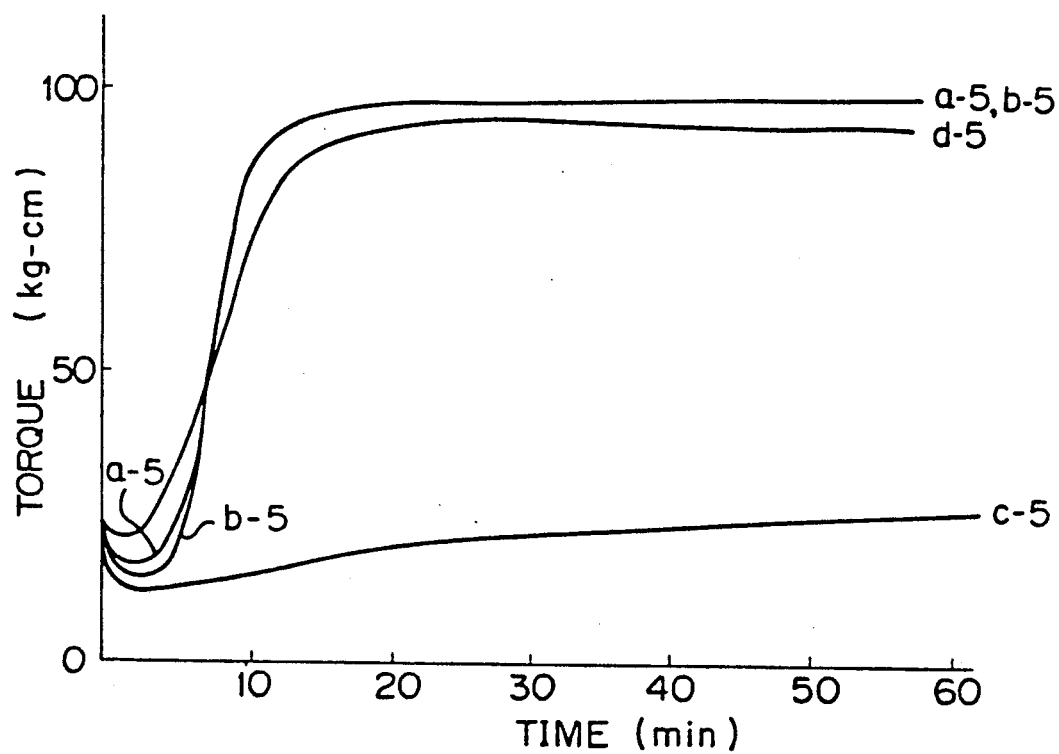

FIG. 5 is a graph of cross-linking, measured using a Disc Rheometer, of compositions obtained by Examples VII-1 and VII-4 and Comparative Examples VII-2 and VII-9. Note that a-5, b-5, c-5, and d-5 respectively show the cross-linking curves of the compositions obtained by Examples VII-1 and VII-4 and Comparative Examples VII-2 and VII-9.

DESCRIPTION OF THE PREFERRED EMBODIMENTS

The present invention will now be explained in detail.

(1) Ethylene-propylene Copolymer

In producing the chlorinated ethylene-propylene copolymer of the present invention, the content of propylene in the ethylene-propylene copolymer used as a material is 15 to 40% by weight, preferably 18 to 40% by weight, more preferably 20 to 38% by weight.

If use is made of an ethylene-propylene copolymer with a propylene content of less than 15% by weight in the chlorination, the resultant chlorinated ethylene-propylene copolymer will be poor in rubbery elasticity and the product would rather become plastic in form. On the other hand, if use is made of an ethylene-propylene copolymer with a propylene content particles of the chlorinated ethylene propylene copolymer obtained in the chlorination will become large and will agglomerate in the reaction system, so this is not preferable.

The MFR of the ethylene-propylene copolymer is 0.01 to 5.0 g/10 minutes, preferably 0.02 to 5.0 g/10 minutes, particularly preferably 0.05 to 5.0 g/10 minutes. If use is made of an ethylene-propylene copolymer with an MFR of less than 0.01 g/10 minutes in the chlorination, the obtained chlorinated ethylene-propylene copolymer will be no good in workability. On the other hand, if use is made of an ethylene-propylene copolymer with an MFR exceeding 5.0/10 minutes in the chlorination, the reaction efficiency in the production of the chlorinated ethylene-propylene copolymer will be poor and, further, the agglomeration of the chlorinated substance will be considerable, so this is not preferable.

Further, the ethylene-propylene copolymer has a melting peak, determined by DCS, of 80° C. or more, preferably 80° to 125° C., more preferably 85° to 125° C. With a melting peak less than 80° C., agglomeration will occur during production and a uniform chlorinated will not be obtainable, so this is not preferable.

Further, the ethylene-propylene copolymer has a crystallinity, determined by X-ray, of 3% or more, preferably 3 to 50%, particularly preferably 3 to 45%. With a crystallinity less than 3%, agglomeration will occur during production and a uniform chlorinated substance cannot be obtained, so this is not preferable.

Further, the ethylene-propylene copolymer has an index $\overline{M}_W/\overline{M}_N$ of the molecular weight distribution, determined by GPC, of more than 4, preferably 8 or less. When this is 4 or less, the obtained chlorinated substance is no good in workability, so this is not preferable.

Further, the ethylene-propylene copolymer has a Mooney viscosity (ML$_{1+4}$, 100° C.) of 10 to 180, preferably 10 to 170, more preferably 10 to 150. If an ethylene-propylene copolymer with a Mooney viscosity of less than 10 iscchlorinated, there will be considerable agglomeration of the chlorinated substance during the chlorination. On the other hand, if an ethylene-propylene copolymer with a Mooney viscosity exceeding 180 is used, the obtained chlorinated substance will be excellent in mechanical properties, but will be poor in rubbery elasticity and rather will become plastic-like.

The ethylene-propylene copolymer is obtained by copolymerization of ethylene and propylene using a so-called Ziegler catalyst in a manner that the above-mentioned ranges of propylene content, MFR, and Mooney viscosity are met. It is produced industrially and is used in many areas.

The chlorinated ethylene-propylene copolymer of the present invention can be produced by chlorinating the above-mentioned ethylene-propylene copolymer by a two-stage method or three-stage method of the present invention.

(2) First Chlorination Method

According to the first chlorinating method of the present invention, a first stage and second stage of chlorination are performed in an aqueous suspension state. To perform this chlorination in an aqueous suspension state, particles or powder of the above-mentioned ethylene-propylene copolymer are suspended in an aqueous medium. To maintain the aqueous suspension state, it is preferable to add a small amount of an emulsifier or suspending agent. At this time, if necessary, benzoil peroxide, azobisisobutyronitrile and hydrogen peroxide or other radical generating agents, light silicone oil or other defoaming agents, and other additives may be added.

(2-1) First Stage Chlorination

In the first stage, the chlorination is performed at a temperature at least 25° C. lower than the melting point of the ethylene-propylene used. In particular, it is desirable to perform the chlorination at a temperature 30° to 60° C. lower than the melting point of the copolymer. If the chlorination is performed at a temperature at least 25° C. lower than the melting point of the copolymer, the particles will not agglomerate during the reaction and the chlorination at the succeeding second stage will be able to be easily performed. On the other hand, if the chlorination is performed at a temperature lower by less than 25° C., the particles will tend to agglomerate during the reaction and it will be difficult to sustain the reaction. Further, the obtained product will have a nonuniform distribution of chlorination degree. The chlorination at the first stage is performed at a temperature higher than 50° C.

First, at the first stage, 20 to 60% of the total chlorination amount must be chlorinated (for example, when producing the chlorinated ethylene-propylene copolymer of the present invention with a chlorine content of 30% by weight, it is necessary to produce a chlorinated ethylene-propylene copolymer with a chlorine content of 8 to 20% by weight in the first stage), with 20 to 55% chlorination preferred. At this stage, if chlorination of less than 20% of the total chlorination amount is performed, the particles will easily agglomerate at the succeeding second stage of the chlorination reaction.

On the other hand, if chlorination of more than 60 percent is performed, uneven chlorination will result and the obtained product will be poor in heat resistance and workability.

After the first stage of chlorination is performed in this way, the second stage of chlorination is performed under the following conditions. Next, the third stage of chlorination is performed, whereby the chlorinated ethylene-propylene copolymer of the present invention can be produced. In the transition from the first stage of chlorination to the second stage of chlorination, the second stage of chlorination may be performed in the reaction vessel used in the first stage of chlorination and just the conditions changed or the aqueous suspension containing the chlorinated ethylene-propylene copolymer produced by the first stage of chlorination may be transferred to a separate reaction vessel controlled in advance to the conditions of the second stage of chlorination.

(2-2) Second Stage Chlorination

The second stage of chlorination is achieved at a temperature 10° C. or more higher than the temperature of the first stage of chlorination, but 5° to 15° C. lower than the melting point of the ethylene-propylene copolymer used. In particular, it is desirable to perform it at a temperature which is 10° C. or more higher than the temperature of the first stage of chlorinated ethylene-propylene copolymer but 5° to 10° C. lower than the melting point of the copolymer. If the second stage of chlorination is performed at a temperature 5° C. or more lower than the melting point of the said copolymer, the product will not have a uniform distribution of chlorination degree and will be inferior in workability and heat resistance. On the other hand, if this stage of chlorination is performed at a temperature more than 15° C. lower than the melting point of the copolymer used, the product will not have a uniform distribution of chlorination degree but will be inferior in workability and heat resistance.

In the above first stage and second stage, 80 to 90% of the chlorination amount, preferably 65 to 90%, more preferably 70 to 90% must be chlorinated. For example, when producing a chlorinated ethylene-propylene copolymer of the present invention with a chlorine content of 30% by weight, it is preferable to produce in the first stage and second stage a chlorinated ethylene-propylene copolymer having a chlorine content of 21 to 27% by weight, preferably 24 to 27% by weight. Note that in the second stage it is necessary to chlorinate at least 30% of the total chlorination amount. If the chlorination at this stage is less than 30% of the total chlorination amount, nonuniform chlorination will result when performing the chlorination in the succeeding third stage and the obtained product (i.e., chlorinated ethylene-propylene copolymer) will be inferior in heat resistance. Note that if chlorination exceeding 90% of the total chlorination amount is performed up to the second stage, the product may agglomerate, so this is not preferable.

After performing the chlorination in the second stage in this way, a third stage of chlorination is performed under the following conditions, whereby it is possible to produce the chlorinated ethylene-propylene copolymer of the present invention. In the transition from the second stage of chlorination to the third stage of chlorination, the third stage of chlorination may be performed in the reaction vessel used in the second stage of chlorination and just the conditions changed or the aqueous suspension containing the chlorinated ethylene-propylene copolymer produced by the second stage of chlorination may be transferred to a separate reaction vessel controlled in advance to the conditions of the third stage of chlorination.

(2-3) Third Stage Chlorination

The chlorination at the third stage may be achieved by performing chlorination of at least 10% of the total chlorination amount at a temperature lower than the melting point of the ethylene-propylene copolymer used, but not less than a temperature of the melting point minus 2° C. (i.e., m.p. −2° C.). If the third stage of chlorination is performed at a temperature lower than the melting point of the copolymer minus 2° C. (i.e., m.p. −2° C.), the product will not have a uniform distribution of chlorination degree and will be inferior in heat resistance, so this is not preferable. On the other hand, if chlorination is performed at a temperature higher than the melting point, the product will easily agglomerate and will be inferior in workability. Further, if chlorination of more then 10% of the total chlorination amount is performed at the third stage, a chlorinated substance of a preferable rubber-like state will not be obtained and the product will be inferior in flexibility, heat resistance, and heat stability.

In the above first stage to third stage of chlorination, the chlorine may be used in a gaseous stage alone or diluted with a suitable inert gas. The chlorine introduction pressure in this case is usually 5 kg/cm$^2$ or less. The state of progress of the chlorination may be determined by measuring the weight loss of the chlorine supplied, but the chlorination degree may be also be determined by measuring the amount of hydrogen chloride produced. The same holds true for the other methods given below.

(3-1) Second Stage Annealing

By following another process of the present invention, annealing and chlorination are performed after the above-mentioned first stage chlorination (2-1).

The annealing in the second stage may be achieved by raising the temperature to 1° to 7° C. higher than the melting point of the ethylene-propylene copolymer and, at that temperature, performing annealing for 10 to 60 minutes without introduction of chlorine In particular, it is desirable to perform this at a temperature 1° to 6° C., more preferably 1° to 5° C. higher than the melting point of the ethylene-propylene copolymer. Further, the time required for the annealing is usually 10 to 60 minutes, but 10 to 50 minutes is preferable and 10 to 40 minutes is particularly suitable. If the annealing is performed at a temperature less than the melting point of the ethylene-propylene copolymer plus 1° C. (i.e., m.p. +1° C.), the product (chlorinated ethylene-propylene copolymer) obtained by the chlorination at the later mentioned third stage will not have a uniform distribution of chlorination degree. On the other hand, if performed at a temperature more than 7° C. over the melting point, the product obtained by the chlorination at the third stage in the next step will easily agglomerate and a good final product will not be obtained. Further, if the annealing is performed for less than 10 minutes, the annealing will be insufficient and the chlorinated ethylene-propylene copolymer finally obtained will not be good. On the other hand, even if the annealing is performed for over 60 minutes, not only will it not be possible to further improve the chlorinated ethylene-propylene copolymer finally obtained, but there will also be cost problems, so this is not practical.

(3-2) Third Stage Chlorination

The chlorination in the third stage may be achieved by performing the remaining chlorination at a temperature 2° to 25° C. lower than the melting point of the ethylene-propylene copolymer used. In particular, it is desirable to perform it at a temperature 2° to 23° C. lower, with a temperature lower by 2° to 20° C. being particularly suitable. If the third stage of chlorination is performed at a temperature more than the melting point of the ethylene-propylene copolymer used minus 2° C. (i.e., m.p. −2° C.), the product will easily agglomerate and a good final product will not be obtained. On the other hand, if the chlorination is performed at a temperature less than the melting point minus 25° C. (i.e., m.p. −25° C.), the obtained chlorinated ethylene-propylene copolymer will be nonuniform in distribution of chlorination and a product with an excellent heat resistance will not be obtainable.

According to the present invention, further, as mentioned above, after the first stage of chlorination (2-1), a second stage of chlorination is performed under the following conditions, whereby a chlorinated ethylene-propylene copolymer of the present invention can be produced. In the transition from the first stage of chlorination to the second stage of chlorination, the second stage of chlorination may be performed in the reaction vessel used in the first stage of chlorination and just the conditions changed or the chlorination may be performed in a separate reaction vessel controlled in advance to the conditions of the second stage of chlorination.

(4) Second Stage Chlorination

The second stage of chlorination may be achieved by performing the remaining chlorination at a temperature which is 10° C. or more higher than the temperature of the first stage of chlorination and 5° to 15° C. lower than the melting point of the ethylene-propylene copolymer used. In particular, it is desirable to perform the same at a temperature 10° C. or more higher than the temperature of the first stage of chlorination and 5° to 10° C. lower than the melting point of the copolymer. If the second stage of chlorination is performed at a temperature more than the melting point of the copolymer minus 5° C. (i.e., m.p. −5° C.), the product will not have a uniform distribution of chlorination degree and will be inferior in workability and heat resistance. On the other hand, if this stage of chlorination is performed at a temperature lower than the melting point minus 15° C. (i.e., m.p. −15° C.), the product will not have a uniform distribution of chlorination degree but will be inferior in workability and heat resistance.

The chlorinated ethylene-propylene copolymer obtained by any of these methods is rinsed to remove adhering hydrochloric acid, emulsifiers, etc., then dried to produce the chlorinated ethylene-propylene copolymer of the present invention.

(5) Physical Properties, Mechanical Properties, and Other Properties of Chlorinated Ethylene-Propylene Copolymer The chlorine content of the chlorinated ethylene-propylene copolymer thus obtained is 20 to 45% by weight, preferably 20 to 42% by weight, more preferably 25 to 42% by weight. With a chlorine content of the chlorinated ethylene-propylene copolymer of less than 20% by weight, there are problems in the reclamation and refinement of the chlorinated ethylene-propylene copolymer obtained. On top of this, it is poor in flame retardance. On the other hand, when over 45% by weight, the chlorinated ethylene-propylene copolymer which is produced drops conspicuously in heat stability and heat resistance, so this is not preferable.

The Mooney viscosity of the chlorinated ethylene-propylene copolymer which is obtained in this way is 10 to 150 points at a temperature of 100° C. determined by a large rotor, preferably 10 to 120 points, particularly suitably 15 to 100 points.

Further, the melt flow index (determined according to ASTM D 1238 at a temperature of 180° C. and load of 21.6 kg, below, "FR") of the chlorinated ethylene-propylene copolymer of the present invention is generally 1 to 100 g/10 minutes, preferably 3 to 50 g/10 minutes, particularly suitably 5 to 30 g/10 minutes.

Typical properties of the chlorinated ethylene-propylene copolymer of the present invention are given below.

The density is 1.00 to 1.30 g/cm$^3$, the tensile breaking strength determined by a tensile test according to ASTM D 530-60T is 5 to 7 kg/cm$^2$, the elongation at break is 800 to 2500 percent, and the hardness (Shore A) is 30 to 70.

(6) Blending and Molding Methods

In blending and molding the chlorinated ethylene-propylene copolymer of the present invention, additives generally blended with chlorinated polyethylene, such as lubricants, coloring agents, antistatic agents, fillers, and stabilizers for oxygen, light, and heat may be mixed in. Further, one may blend in resin substances such as graft polymers obtained by graft polymerization of one or more of generally used rubbery substances such as chlorinated polyethylene, styrene-butadiene copolymer rubber, acrylonitrile-butadiene copolymer rubber, copolymer or terpolymer rubbers comprising principally ethylene and propylene, chloroprene rubber, chlorosulfonated polyethylene rubber substances, butadiene homopolymer rubber, and natural rubber and polyvinyl chloride, olefin resins comprising principally ethylene and/or propylene, methyl methacrylate resins comprising principally methyl methacrylate, acrylonitrile styrene copolymer resins, and methyl methacrylate, and other vinyl compounds.

When producing these compositions, the formulation (blending) may be achieved by the method of blending using an open roll, drive blender, Bambury mixer, kneader, or other mixers generally used in the field of the art. Among these blending methods, use may be suitably made of two or more blending methods for the purpose of obtaining a more uniform composition (for example, the method of blending first with a drive blender and then blending the mixture with open rolls). In these blending methods, further, a blending temperature of 30° to 120° C., usually 50° to 100° C., is used for blending chlorinated ethylene-propylene copolymers and rubbery substances. In particular, during the blending, the rubbery substance gives off heat due to the agglomeration force, so the blending temperature should desirably be controlled to 150° C. or less. Further, when blending chlorinated ethylene-propylene copolymer and a resin substance, the temperature is one at which these melt or above, but desirably 180° C. or less.

The chlorinated ethylene-propylene copolymer of the present invention and these compositions are molded into the desired shapes for use using molders conventionally used in the general rubber industry and the resin industry, for example, extruders, injection molders, compression molders, and calenders. Note that when molding only chlorinated ethylene-propylene copolymer, the molding temperature is 70° to 130° C., generally 90° to 120° C.

(7) Vulcanized Composition of Present Invention (A) Chlorinated Ethylene-Propylene Copolymer The chlorinated ethylene-propylene copolymer used as the component (A) of the composition of the present invention is produced by the above-mentioned method.

(B) Thiourea Composition

The thiourea composition used in the present invention is shown in the afore-mentioned general formula (I).

The hydrocarbon group is selected from the alkyl group, cycloalkyl group, aryl group, and aralkyl group and specifically may be the methyl group, propyl group, butyl group, cyclohexyl group, and benzyl group.

Examples of such thiourea compounds are N,N'-diphenylthiourea, N,N'-diethylthiourea, N,N'-diethylenethiourea, N,N'-dibutylthiourea, and N,N'-dilaurylthiourea. In particular, N,N'-diethylthiourea is suitable.

(C) Sulfur and Sulfur Donor

In the present invention, among the sulfur or sulfur donor used as component (C), the sulfur donor means a compound able to discharge sulfur at a relatively high temperature (in general 50° to 200° C.). Typical examples of such a sulfur donor are those listed in "Binran Gomu Purasuchikku Haigo Yakuhin" (Handbook of Rubber and Plastic Formulation Chemicals) (ed. by Rubber Digest Co., 1974), page 19 to page 57 which have polysulfide bonds of disulfide or higher.

Among these sulfur donors, typical ones are tetramethylthiuram disulfide, dipentamethylenethiuram disulfide, and dipentamethylenethiuram tetrasulfide. Among these sulfur donors, those which discharge sulfur in the temperature range of 100° to 200° C. (for example, dipentamethylenethiuram tetrasulfide) are particularly suitable. Further, the sulfur compounds listed on page 3 to page 5 of the above-mentioned publication may also be used desirably as sulfur donors. Typical examples of such sulfur compounds are sulfur monochloride, sulfur dichloride, molybdenum sulfide, and alkyl phenol disulfide.

Further, typical examples of the sulfur used in the present invention are listed on page 1 to page 3 of the above-mentioned publication. Typical examples are powdered sulfur, flower of sulfur, precipitated sulfur, colloid sulfur, and surface treated sulfur.

(D) Metal Compound

As the metal compound serving as the acid accepting agent used as component (D) in the present invention, mention may be made of oxides, hydroxides, carbonates, carboxylates, silicates, fluorates, and phosphites of metals of group II of the Periodic Table and oxides, basic carbonates, basic carboxylates, basic phosphites, basic sulfites, and tribasic sulfates of metals of group IVa of the Periodic Table.

As typical examples of such metal compounds, mention may be made of magnesium oxide (i.e., magnesia), magnesium hydroxide, magnesium carbonate, barium hydroxide, barium carbonate, calcium oxide (i.e., slaked lime), calcium hydroxide (slaked lime), calcium carbonate, calcium silicate, calcium stearate, calcium phthalate, magnesium phosphite, calcium phosphite, stannous chloride, litharge, red lead, white lead, dibasic lead phthalate, dibasic lead carbonate, dibasic lead stearate, basic lead phosphite, basic tin phosphite, basic lead sulfite, and tribasic lead sulfate.

The average particle size of the said metal compound is 0.1 to 100 microns, preferably 0.2 to 110 microns, particularly preferably 0.5 to 50 microns. If a metal compound with an average particle size of less than 0.1 micron is used, particles will fly about during kneading and there will be a problem in handling. On the other hand, when use is made of one over 100 microns, secondary agglomeration will easily occur and it will be difficult to achieve uniform dispersion.

In producing the chlorinated ethylene-propylene copolymer of the present invention, it is possible to formulate the desired metal compound by formulating into the chlorinated ethylene-propylene copolymer the above thiouric compounds, sulfur and/or sulfur donor, and metal compound serving as the acid accepting agent, but it is also possible to formulate other vulcanization accelerators.

(E) Thiocarbamates

As the thiocarbamates used as component (E) in the present invention, mention may be made of those represented by the following general formula (III):

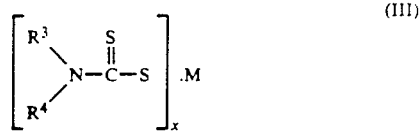

In general formula (III), $R^3$ and $R^4$ may be the same or different and may form a ring bonded together. $R^3$ and $R^4$ are hydrocarbon groups of at most 18 carbon atoms. As the hydrocarbon groups, mention may be made of the alkyl group, cycloalkyl group, aryl group, and aralkyl group. Further, M is a metal (for example, tellurium, selenium, sodium, potassium, lead, copper, zinc, iron, bismuth, cadmium, cobalt, magnesium, and manganese) and amines (for example, dimethylamine, diethylamine, dibutylamine, N,N'-dimethylcyclohexamine, piperzine, and pipecoline), and x is an integer from 1 to 4.

As typical examples of the dicarbamates, mention may be made of sodium dimethyldithiocarbamate, sodium diethyldithiocarbamate, sodium di-n-butyldithiocarbamate, sodium pentamethylenethiocarbamate, potassium dimethyldithiocarbamate, potassium di-n- butyldithiocarbamate, lead dimethyldithiocarbamate, lead pentamethylenethiocarbamate, lead ethylphenyldithiocarbamate, zinc dimethyldithiocarbamate, zinc diethyldithiocarbamate, zinc di-n-butyldithiocarbamate, zinc dibenzyldithiocarbamate, zinc N-pentamethylenethiocarbamate, zinc ethylphenyldithiocarbamate, selenium dimethyldithiocarbamate, selenium diethyldithiocarbaminate, tellurium diethyldithiocarbamate, cadmium diethyldithiocarbamate, cadmium pentamethylenedithiocarbamate, copper dimethyldithiocarbamate, lead dimethyldithiocarbamate, bismuth dimethyldithiocarbamate, dimethylammonium dimethylthiocarbamate, dibutylammonium dibutyldithiocarbamate, diethylammonium diethyldithiocarbamate, N,N'-dimethylcyclohexamine salt of dibutyldithiocarbamate, piperizine pentamethylenedithiocarbamate, pipecoline methylpentamethylenedithiocarbamate, etc.

(F) Mercaptotriazine Compounds

The mercaptotriazine compound used as component (F) in the present invention is one used as a vulcanization agent or vulcanization accelerator in the rubber industry and is expressed by the above-mentioned general formula (II).

In the above-mentioned formula (II), $R^2$ may be an amino group or a hydrocarbon group having at most 20 carbon atoms.

As typical examples of these mercaptotriazine compounds, mention may be made of 1,3,5-trithiocyanalate, 1-hexylamino-3,5-dimethylmercaptotriazine, 1-diethylamino-3,5-dimercaptotriazine, 1-cyclohexylamino-3,5-dimercaptotriazine, etc. These compounds are described in detail in Japanese Unexamined Patent Publication (Kokai) No. 59-10099.

(X) Other Vulcanization Accelerator

The other vulcanization accelerator used optionally in the present invention is one widely used as a vulcanization promotor in the rubber industry. Typical examples are diorthotolylguanidine and other guanidines, acetoaldehydoaniline reaction products, butylaldehydoaniline condensation products, butylaldehydomonobutylamine condensation products, hexamethylenetetramine, acetoaldehydoammonia, and other aldehydoamines and aldehydoammonias; 2-mercaptobenzothiazole, dibenzothiazole disulfide, sodium salts of 2-mercaptobenzothiazole, cyclohexylamine salts of 2-mercaptobenzothiazole, N-cyclohexyl-2-benzothiazole sulfanamide, 2-mercaptoimidazoline (ethylene thiourea), and other thiazoles and imidazolines; diethylthiourea, diorthotolylthiourea, and other thioureas; tetramethylthiurammonosulfides, tetramethylthiuramdisulfides, tetraethylthiuramdisulfide, tetrabutylthiuramdisulfide, dipentamethylenethiuramtetrasulfide, and other thiurams; sodium dimethyldithiocarbamate, sodium di-n-butyldithiocarbamate, selenium dimethyldithiocarbamate, tellurium diethyldithiocarbamate, piperizinepentamethylenedithiocarbamate, and other dithiocarbamates; zinc dibutylxanthogenate, sodium isopropylxanthogenate, and other xanthates; mixtures of mercaptoenzothiazole and hexamethylenetetramines, mixtures of mercaptobenzothiazole and dithiocarbamates, mixtures of zinc dimethyldithiocarbamate and tetramethylthiuramdisulfide, mixtures of tetramethylthiuramdisulfide and mercaptobenzothiazole, and other blended accelerators; and triazine derivatives and other accelerators. Further, amines listed on page 64 to page 67 of the above-mentioned publication, the phosphorus compounds listed on page 170 to page 173 of the same, and other nucleophilic reagents which may typically be used as vulcanization accelerators are described in Japanese Unexamined Patent Publication (Kokai) No. 59-15440.

(8) Composition Ratio

The composition ratios of the other components of the composition to 100 parts by weight of the chlorinated ethylene-propylene copolymer (A) are as shown below.

The thiouric compound (B) is present in an amount of 1.0 to 10.0 parts by weight, preferably 2.0 to 10.0 parts by weight, particularly preferably 3.0 to 10.0 parts by weight. If the composition ratio of the thiouric compound is less than the lower limit, the obtained composition will be insufficient in vulcanization ability. On the other hand, even if formulated in more than the upper limit, it is not possible to further improve the vulcanization ability.

The composition ratio of the sulfur and sulfur donor (C) is 0.1 to 10.0 parts by weight as a total of the two, preferably 0.1 to 7.0 parts by weight, particularly preferably 0.2 to 7.0 parts by weight. If the composition ratio of the sulfur and sulfur donor is less than 0.1 part by weight in total, a composition with a good vulcanization ability cannot be obtained. On the other hand, even when formulated over 10.0 parts by weight, not only is it not possible to further improve the vulcanization ability, but the rubber elasticity of the vulcanized product also falls.

The composition ratio of the metal compound (C) is 1.0 to 15.0 parts by weight, preferably 2.0 to 15.0 parts by weight, particularly preferably 3.0 to 12.0 parts by weight. When the composition ratio of the metal compound is less than 1.0 part by weight, the chlorinated ethylene-propylene copolymer undergoes a dehydrochlorination reaction. On the other hand, even when formulated over 15.0 parts by weight, not only is it not possible to further prevent a dehydrochlorination reaction, but the workability becomes poor and further the rubber strength of the obtained vulcanized product drops.

The composition ratio of the dithiocarbamate (F) is 0.05 to 5.0 parts by weight, preferably 0.1 to 5.0 parts by weight, particularly preferably 0.1 to 4.0 parts by weight. When the composition ratio of dithiocarbamate is less than 0.05 part by weight, the obtained composition is poor in vulcanization effect and is poor in effective improvement of the compression set. On the other hand, even when formulated in over 5.0 parts by weight, the molded articles of the obtained composition not only suffers from bleedout, but also falls in blendability and moldability. Further, the mercaptotriazine compound (F) is present in 0.01 to 2.0 parts by weight, preferably 0.02 to 1.5 parts by weight, particularly preferably 0.1 to 1.2 parts by weight. If the composition ratio of the mercaptotriazine compound is less than 0.01 part by weight, the cross-linking becomes too tight, so it is difficult to control the cross-linking. On the other hand, if formulated in over 2.0 parts by weight, the cross-linked product obtained is not good in tear strength at high temperatures, so this is not preferable.

On top of this, when formulating in the above-mentioned other vulcanization accelerator (X), in general the composition ratio is at most 10.0 parts by weight.

(9) Blending Method, Vulcanization Method, Molding Method, Etc.

By blending the above substances homogeneously, it is possible to obtain the composition of the present invention, but addition may also be made, in accordance with the object of use of the composition, of additives generally used in the rubber industry, such as fillers, plasticizers, stabilizers against oxygen, ozone, heat, and light (e.g., ultraviolet light), lubricants, and coloring agents. Further, formulation may be made of rubbery substances generally used such as chlorinated polyethylene, styrene-butadiene copolymer rubber, acrylonitrile-butadiene copolymer rubber, copolymer or terpolymer rubbers comprised principally of ethylene and propylene, chloroprene rubber, chlorosulfonated polyethylene rubber substances, butadiene homopolymer rubber, and natural rubber.

To obtain the composition of the present invention, use may be made of the blending usually performed in the rubber industry. When producing the composition, it is fundamentally important that the chlorinated ethylene-propylene copolymer not vulcanize. Due to this, the blending is generally performed at room temperature to 100° C.

The composition obtained in this way is used to form a desired shape using a machine generally used in the rubber industry, such as an extruder molder, injection molder, or compression molder.

The vulcanization is performed by heating by a steam vessel, air bath, etc. during the molding at a temperature range of 100° to 200° C. The vulcanization time differs depending on the vulcanization temperature, but in general is 0.5 to 120 minutes.

(10) Cross-Linked Chlorinated Ethylene-Propylene Copolymer Composition

According to another embodiment of the present invention, provision is made of a cross-linked composition in which an organic peroxide (G) is formulated in the chlorinated ethylene-propylene copolymer (A).

The organic peroxide used here is not particularly limited, but in particular one which has a decomposition temperature (temperature at which half life is one minute) of 120° C. or more, particularly preferably 140° C. or more. As typical examples of suitable organic peroxides, mention may be made of 1,1-bis-tertiary butylperoxide, 3,3,5-trimethylcyclohexane, and other ketone peroxides, 2,5-dimethylhexane-2; 5-dihydroperoxide and other hydroperoxides, 2,5-dimethyl-2,5-di-tertiary butylperoxyhexane and other peroxyesters, benzoilperoxides and other diacylperoxides, and dicumylperoxides and other dialkylperoxides.

Further, polyfunctional substances such a triarylcyanulate and triarylisocyanulate used as cross-linking auxiliaries in the rubber industry may also be added.

Further, by formulating in mercaptotriazine compounds, it is possible to improve the tear strength of the composition at a relatively high temperature. Said mercaptotriazine compound is one used as a vulcanization agent or vulcanization accelerator in the rubber industry and is shown by the above-mentioned general formula (II).

In producing the composition of the present invention, to prevent dehydrochlorination, the above-mentioned compound may be formulated in as an acid acceptor.

The composition ratio of the organic peroxide is 0.1 to 10.0 parts by weight, preferably 0.5 to 10.0 parts by weight, particularly preferably 0.5 to 8.0 parts by weight. When the composition ratio of the organic peroxide to 100 parts by weight of the chlorinated ethylene-propylene copolymer is less than 0.1 part by weight, a composition with superior mechanical properties cannot be obtained. On the other hand, when over 10.0 parts by weight, there are problems in the points of flexibility etc.

Further, when formulating in mercaptotriazine compounds, the composition ratio with respect to 100 parts by weight of the chlorinated ethylene-propylene copolymer is in general at most 2.0 parts by weight, preferably 0.01 to 2.0 parts by weight, particularly preferably 0.02 to 1.5 parts by weight, further preferably 0.1 to 1.2 parts by weight. If the mercaptotriazine compound is formulated in more than 2.0 parts by weight with respect to 100 parts by weight of the chlorinated ethylene-propylene copolymer, the cross-linking conversely declines.

Further, when formulating a metal compound, the composition ratio is in general at most 15.0 parts by weight, preferably 1.0 to 15.0 parts by weight, more preferably 2.0 to 15.0 parts by weight, particularly preferably 3.0 to 12.0 parts by weight. Even when formulated in over 15.0 parts by weight, not only it is impossible to further prevent the dehydrochlorination reaction, but also the obtained cross-linked product drops in rubber strength.

When producing the compositions of the present invention, the formulation (blending) may be achieved by the method of mixing using an open roll, drive blender, Bambury mixer, kneader, or other mixers general used in the field of the art. Among these blending methods, use may be suitably made of two or more blending methods for the purpose of obtaining a more uniform composition (e.g., the method of blending first with a drive blender and then blending the mixture with open rolls). In these blending methods, if the melting and kneading are performed at a relatively high temperature, part or all of the chlorinated ethylene-propylene copolymer used may cross-link. Therefore, these must usually be performed at 70° C. or less.

In producing the chlorinated ethylene-propylene copolymer composition of the present invention, additives generally mixed with chlorinated polyethylene, such as lubricants, coloring agents, antistatic agents, fillers, and stabilizers for oxygen, light, and heat may be mixed in. Further, one may mix in generally used rubbery substances such as chlorinated polyethylene, styrene-butadiene copolymer rubber, acrylonitrile-butadiene copolymer rubber, copolymer or terpolymer rubbers comprising principally ethylene and propylene, chloroprene rubber, chlorosulfonated polyethylene rubber substances, butadiene homopolymer rubber, and natural rubber.

The composition of the present invention may be shaped into dust shields using molders conventionally used in the general rubber industry for example, extruders, injection molders, compression molders, and calenders. Further, it is possible to use the method of adding the chlorinated ethylene-propylene copolymer or the above-mentioned composition while cross-linking, as in the field of art of rubber, so as to produce the molded article, i.e., it is possible to use the method of simultaneous cross-linking and molding to form the desired molded article using a molder such as a conventional calender.

The chlorinated ethylene-propylene copolymer obtained by the present invention not only has a superior vulcanization ability compared to the usual chlorinated polyethylene, as clear from FIG. 1 to FIG. 5, but also exhibits the following effects:
(1) Excellent ozone resistance
(2) Superior rebound
(3) Excellent flame retardance
(4) Superior weather resistance and durability
(5) Excellent tear strength and other mechanical strengths
(6) Superior oil resistance
(7) Excellent heat resistance and low temperature resistance
(8) Superior adhesiveness Since the chlorinated ethylene-propylene copolymer of the present invention has superior properties as mentioned above, it can be used in numerous areas. Typical applications are given below:
(1) By blending with polypropylene, acrylonitrile-butadiene-styrene terpolymer resins (ABS resins), high density polyethylene, low density polyethylene, polyvinyl chloride, etc., not only can the flame retardance of these resins be improved, but also the mechanical properties (for example, impact resistance) can be improved.
(2) By formulating in a generally used flame retardant, use may be made as a harder flame retardant material.
(3) Various components for automobiles (for example, hoses, tubes)
(4) Coverings of electrical cables
(5) Adhesives
(6) Components of electronic equipment, electrical equipment, and the like.

The compositions obtained by the present invention exhibit the following effects:
(1) Excellent mechanical properties (for example, tensile strength)
(2) Superior dimension accuracy of molded articles
(3) Excellent chemical resistance and weather resistance
(4) Good compression set
(5) Superior cross-linking of cross-linked article
(6) Excellent heat resistance

EXAMPLES

The present invention will now be explained in further detail by showing Examples, Comparative Examples, and Reference Examples, but the scope of the present invention is not, of course, limited to these Examples.

The physical properties in the Examples below were determined by the following methods:

| | |
|---|---|
| Tensile strength: | ASTM D530-60T (tensile strength: 500 mm/min) |
| Elongation: | ASTM D530-60T |
| Compression set: | ASTM D395 (Method A) |
| Mooney viscosity: | ASTM D927-57T (temperature of 100° C., one minute preheating, use of large rotor, value after four minutes) |
| Heat resistance: | ASTM D573-53 |
| Tear Strength: | ASTM D624-54 (Method B) |

-continued

| | |
|---|---|
| Melt flow (MFR): | ASTM D1238 (Condition L) |
| Melt flow (FR): | ASTM D1238 (temperature of 180° C., load of 21.6 kg) |
| Hardness: | ASTM D676-59T |
| Test Sample | |
| Dumbbell: | ASTM D412-61T |
| Thickness: | ASTM D-15 |

Example I-1

A glass-lined autoclave of 100 liter capacity was charged with 80 liters of water, 80 g of sodium laurate and 10 kg of an ethylene-propylene copolymer with a propylene content of 22% by weight and a Mooney viscosity ($ML_{1+4}$, 100° C.) of 115 (MFR=1.0 g/10 min, melting point=120° C., crystallinity=5.1%, $\overline{M}_W/\overline{M}_N$=5.0, hereinafter referred to as "EPR I-1"). This was agitated and chlorinated in a temperature range of 50° to 90° C. until the chlorine content of the said copolymer became 18.2% by weight (first stage chlorination). The reaction system was then raised to 105° to 115° C. and chlorination performed in that temperature range until a chlorine content of 27.1% by weight (i.e., second stage chlorination). At a temperature range of 118° to 120° C., chlorination was then performed until a chlorine content of 30.2% by weight (i.e., third stage chlorination) and thus a chlorinated ethylene-propylene copolymer (hereinafter referred to as "CLEPR I-A") was produced.

Example I-2

The first stage chlorination was performed under the same conditions as Example I-1. The reaction system was then raised to 105° to 115° C. and chlorination performed in that temperature range until a chlorine content of 36.1% by weight (i.e., second stage chlorination). Thereafter, at a temperature range of 118° to 120° C., chlorination was performed until a chlorine content of 41.1% by weight (i.e., third stage chlorination) and thus a chlorinated ethylene-propylene copolymer (hereinafter referred to as "CLEPR I-B") was produced.

Example I-3

Instead of the EPR I-1 used in Example I-1, use was made of an ethylene-propylene copolymer having a propylene content of 24.5% by weight and a Mooney viscosity ($ML_{1+4}$, 100° C.) of 34.1 (MFR=4.8 g/10 minutes, crystallinity =3.5% $\overline{M}_W/\overline{M}_N$=7.5, melting point=80° C.) for first stage chlorination in a temperature range of 50° to 55° C. until a chlorine content of 17.6% by weight. Thereafter, the second stage chlorination was performed at a temperature range of 65° to 75° C. until a chlorine content of 26.8% by weight. Further, chlorination was performed at a temperature range of 78° to 80° C. (i.e., third stage chlorination) to produce a chlorinated ethylene-propylene copolymer having a chlorine content of 31.3% by weight (hereinafter referred to as "CLEPR I-C").

Comparative Example I-1

Instead of the EPR I-1 used in Example I-1, use was made of an ethylene-propylene copolymer having a propylene content of 31.8% by weight and a Mooney viscosity ($ML_{1+4}$, 100° C.) of 58.7 (MFR=8.2 g/10 minutes, crystallinity=2.5%, $\overline{M}_W/\overline{M}_N$=3.8, melting point=35° C.) for first stage to third stage chlorination under otherwise the same conditions as in Example I-1. The chlorine content of the obtained chlorinated ethylene-propylene copolymer (hereinafter referred to as "CLEPR I-D") was 30.3% by weight.

Comparative Example I-2 to I-7

Samples of EPR I-1 used in Example I-1 were chlorinated in the temperature ranges shown in Table I-1 until the chlorine contents shown in Table I-1 for the first stage chlorinations. Next, the chlorinated substances obtained in this way were immediately subjected to chlorination in the temperature ranges shown in Table I-1 (i.e., second stage chlorination) to produce the chlorinated substances. Further, chlorination was performed as shown in Table I-1 (i.e., third stage chlorination) to produce the chlorinated ethylene-propylene copolymers having the chlorine contents shown in Table I-1.

TABLE I-1

| Comp. Ex- ample No. | First stage Chlorination | | Second stage Chlorination | | Third stage Chlorination (1) | |
|---|---|---|---|---|---|---|
| | Temp. range (°C.) | Chlorine content (% wt) | Temp. range (°C.) | Chlorine content (% wt) | Temp. range (°C.) | Chlorine content (% wt) |
| I-2 | 100–104 | 18.5 | 105–115 | 27.0 | 118–120 | 30.2 |
| I-3 | 30–47 | 18.2 | 100–104 | 27.0 | 118–120 | 31.0 |
| I-4 | 30–47 | 18.2 | 118–120 | 27.0 | 118–120 | 30.1 |
| I-5 | 105–115 | 18.2 | 116–117 | 27.0 | 118–120 | 30.3 |
| I-6 | 50–90 | 25.0 | 105–115 | 27.0 | 118–120 | 30.4 |
| I-7 | 50–90 | 18.2 | 100–104 | 27.0 | 118–120 | 33.0 |

(1) Chlorine contents of chlorinated polyethylenes after third stage chlorination.

In the first stage chlorination of Comparative Examples I-1, I-2, and I-5, agglomeration occurred and good products could not be obtained. Further, the chlorine distribution in the second stage chlorination of Comparative Example I-3 was nonuniform. Further, in Comparative Example I-4, agglomeration occurred in the second stage chlorination, the chlorine distribution was nonuniform, and an excellent chlorinated ethylene-propylene copolymer could not be obtained.

The physical properties of the chlorinated ethylene-propylene copolymers obtained in Examples I-1 to I-3 and Comparative Examples I-6 and I-7 were determined. The results are shown in Table I-2.

TABLE I-2

| Example or Comp. Example No. | 100% modulus (kg/cm²) | Tensile strength (kg/cm²) | Elongation at break (%) | Mooney viscosity | F.R. (g/10 min.) |
|---|---|---|---|---|---|
| Example | | | | | |
| I-1 | 7 | 30 | 2010 | 61 | 11.0 |
| I-2 | 12 | 68 | 1540 | 85 | 5.2 |
| I-3 | 6 | 28 | 2210 | 20 | 12.6 |
| Comp. Example | | | | | |
| I-6 | 28 | 73 | 1010 | 88 | 4.2 |
| I-7 | 40 | 92 | 890 | 96 | 4.6 |

REFERENCE EXAMPLES

A comparative study was made of the vulcanizatino ability of chlorinated ethylene-propylene copolymers obtained by the present invention and the chlorinated polyethylenes available on the commercial market.

REFERENCE EXAMPLE 1

To 100 parts by weight of the CLEPR I-A obtained by Example I-1 were blended 10 parts by weight of magnesium oxide as an acid accepting agent, 50 parts by weight of carbon black (Asahi Carbon Black Co., SRF#50, average particle size 94 nm) as a filler, 30 parts by weight of trioctyltrimellitate as a plasticizer, 0.5 part by weight of sulfur as a vulcanization agent, and 4.5 parts by weight of diethylthiourea as a vulcanization accelerator at room temperature using an open roll for full kneading for 20 minutes to make a sheet.

REFERENCE EXAMPLE 2

Instead of the CLEPR I-A used in Example I-1, use was made of chlorinated polyethylene having a Mooney viscosity ($MS_{1+4}$, 100° C.) of 70 and a chlorine content of 30.3% by weight obtained by chlorinating by the aqueous suspension method a high density polyethylene having a molecular weight of about 200,000 and a density of 0.950 g/cm³. Otherwise, the same conditions were used as in Reference Example 1 for kneading to form a sheet.

Figure 1:
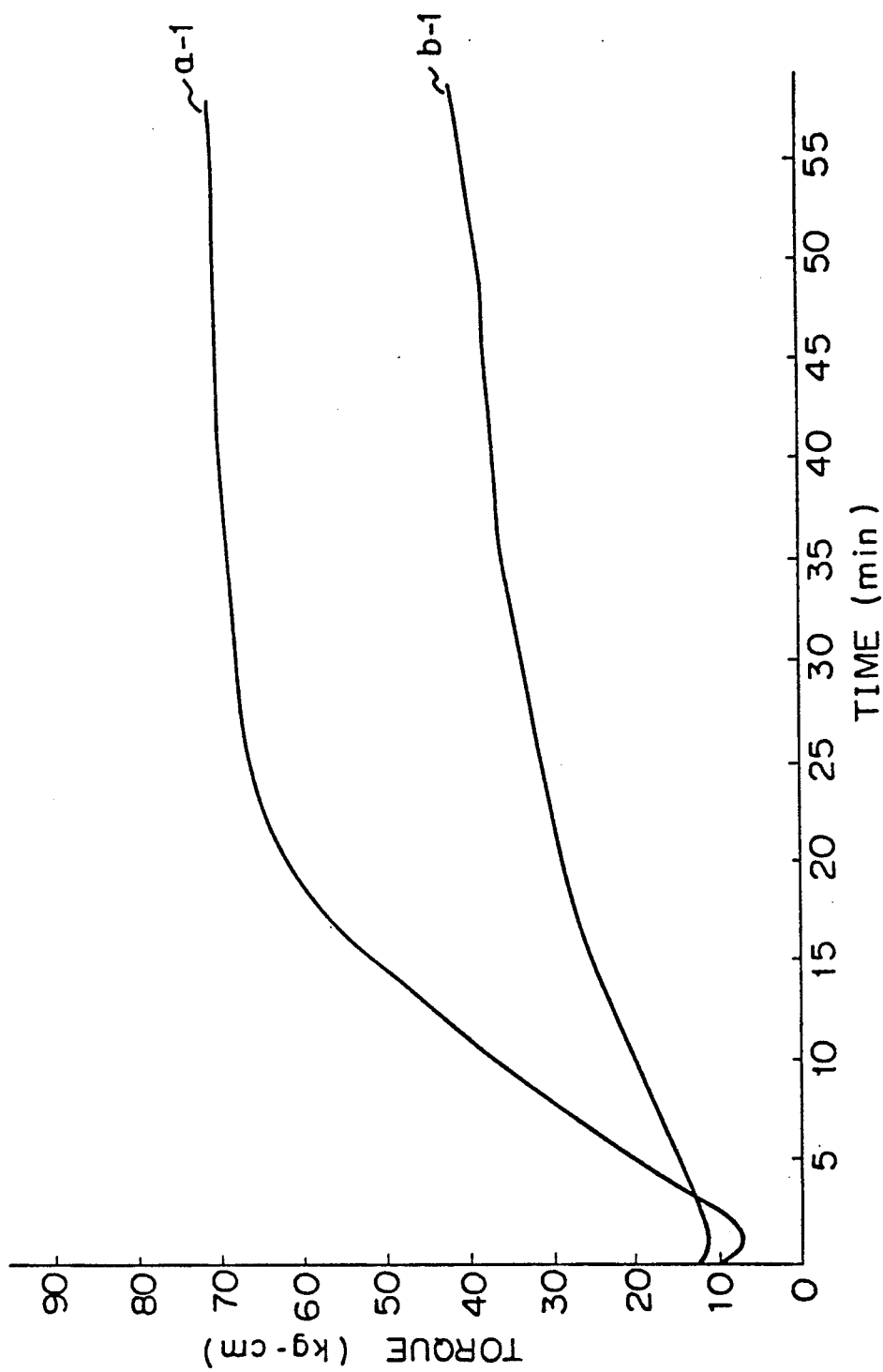
FIG. 1 is a graph of vulcanization, measured using a Disc Rheometer, of sheets (i.e., compositions) obtained by Reference Example 1 and Reference Example 2.

The sheets of Reference Example 1 (a-1) and Reference Example 2 (b-1) obtained in this way were observed as to their vulcanization states in a rheometer tester under conditions of a temperature of 165° C. and an angle of 3 degrees. The vulcanization curves of the same are shown in FIG. 1.

Example II-1

A glass-lined autoclave of 100 liter capacity was charged with 80 liters of water, 80 g of sodium laurate and 10 kg of an ethylene-propylene copolymer with a propylene content of 22% by weight and a Mooney viscosity ($ML_{1+4}$, 100° C.) of 115 (MFR=1.0 g/10 min, crystallinity =6.2%, $\overline{M}_W/\overline{M}_N$=6.1, melting point=120° C., hereinafter referred to as "EPR II-1"). This was agitated and chlorinated in a temperature range of 50° to 90° C. until the chlorine content of the said copolymer became 18.2% by weight (i.e., first stage chlorination). The reaction system was then raised to 121° to 125° C. and, at that temperature range, the introduction of chlorine was suspended and annealing performed for 30 minutes (i.e., second stage annealing). Thereafter, the reaction system was cooled and, at a temperature range of 95° to 118° C., chlorination performed until a chlorine content of 30.4% by weight (i.e., third stage chlorination) to produce the chlorinated ethylene-propylene copolymer (hereinafter referred to as "CLEPR II-A").

Example II-2

Instead of the EPR II-1 used in Example II-1, use was made of an ethylene-propylene copolymer with a propylene content of 24.5% by weight and a Mooney viscosity ($ML_{1+4}$, 100° C.) of 34 (MFR=4.8 g/10 min, crystallinity=3.2%, $\overline{M}_W/\overline{M}_N$=5.2, melting point=80° C.) and the first stage chlorination performed at the temperature range of 50° to 55° C. in the same way as in Example II-1. The chlorine content of the chlorinated substance obtained at this stage was 18.2%. Next, the reaction system was raised in temperature and, at a temperature range of 85° to 87° C., second stage annealing performed in the same way as Example II-1. Next, the reaction system was cooled and, at a temperature range of 55° to 78° C., the third stage chlorination performed until a chlorine content of 30.5% by weight to produce a chlorinated ethylene-propylene copolymer (hereinafter referred to as "CLEPR II-B").

EXAMPLE II-3

Using the EPR II-1 used in Example II-1 and under the same conditions as Example II-1, first stage chlorination was performed until a chlorine content of 21.5% by weight. Next, second stage annealing and third stage chlorination were performed in the same way as Example II-1 to produce a chlorinated ethylene-propylene copolymer having a chlorine content of 40.3% by weight (hereinafter referred to as "CLEPR II-C").

Comparative Example II-1

Instead of the EPR II-1 used in Example II-1, use was made of an ethylene-propylene copolymer having a propylene content of 31.8% by weight and a Mooney viscosity ($ML_{1+4}$, 100° C.) of 58.7 (MFR=8.2 g/10 minutes, crystallinity=2.5%, $\overline{M}_W/\overline{M}_N$=3.8, melting point=35° C.). Otherwise, the first stage chlorination and second stage chlorinatin were performed in the same way as Example II-1 (with no second stage annealing performed). The chlorine content of the chlorinated ethylene-propylene copolymer obtained (hereinafter referred to as "CLEPR II-D") was 31.5% by weight.

Comparative Examples II-2 to II-7

Samples of the EPR II-1 used in Example II-1 were chlorinated at the temperature ranges shown in Table II-1 until the chlorine contents shown in Table II-1 for the first stage chlorinations. The chlorinated substances obtained in this way were then immediately subjected to the second stage in the temperature ranges shown in Table II-1 and, further, chlorination performed in the temperature ranges shown in Table II-1 (i.e., third stage chlorination) to produce the chlorinated ethylene-propylene copolymers having the chlorine contents shown in Table II-1.

TABLE II-1

| Comp. Example No. | First stage Chlorination Temp. range (°C.) | First stage Chlorination Chlorine content (% wt) | Second state annealing Temp. range (°C.) | Third stage Chlorination Temp. range (°C.) | Third stage Chlorination Chlorine[1] content (% wt) |
|---|---|---|---|---|---|
| II-2 | 100–104 | 18.2 | 127 | 110–118 | 30.4 |
| II-3 | 30–47 | 18.1 | 125 | 110–118 | 31.5 |
| II-4 | 30–47 | 18.3 | 119 | 110–118 | 30.6 |
| II-5 | 105–115 | 18.0 | 125 | 110–115 | 30.3 |
| II-6 | 50–90 | 18.1 | 115 | 110–118 | 30.1 |
| II-7 | 50–90 | 18.3 | 121 | 80–90 | 30.2 |

[1] Chlorine content of chlorinated polyethylenes after third stage chlorination.

In the first stage chlorination of Comparative Examples II-1, II-2, and II-5, agglomeratin occurred and good products could not be obtained. Further, in Comparative Examples II-3 and II-4, in the second stage chlorinations, no agglomeration occurred, but the chlorine distribution was nonuniform.

The physical properties of the chlorinated ethylene-propylene copolymers obtained by Examples II-1 to II-3 and Comparative Examples II-6 and II-7 were determined. The results are shown in Table II-2.

TABLE II-2

| Example or Comp. Example No. | 100% modulus (kg/cm²) | Tensile strength (kg/cm²) | Elongation at break (%) | Mooney viscosity | F.R. (g/10 min.) |
|---|---|---|---|---|---|
| Example | | | | | |
| II-1 | 7 | 22 | 1980 | 42.0 | 10.0 |
| II-2 | 4 | 16 | 2210 | 12.0 | 3.6 |
| II-3 | 5 | 20 | 1000 | 52.0 | 12.0 |
| Comp. Example | | | | | |
| II-6 | 36 | 96 | 900 | 100.0 | 3.6 |
| II-7 | 30 | 62 | 920 | 107.8 | 5.4 |

Example III-1

A glass-lined autoclave of 100 liter capacity was charged with 80 liters of water, 80 g of sodium laurate and 10 kg of an ethylene-propylene copolymer with a propylene content of 22% by weight and a Mooney viscosity ($ML_{1+4}$, 100° C.) of 115 (MFR = 1.0 g/10 min, melting point = 120° C., crystallinity = 6.2%, $\overline{M}_W/\overline{M}_N$ = 6.1, hereinafter referred to as "EPR III-1"). This was agitated and chlorinated in a temperature range of 50° to 90° C. until the chlorine content of the said copolymer became 18.2% by weight (i.e., first stage chlorination). The reaction system was then raised to 105° to 115° C. and, at that temperature range, chlorination performed until a chlorine content of 31.3% by weight (i.e., second stage chlorination) to produce a chlorinated ethylene-propylene copolymer (hereinafter referred to as "CLEPR III-A").

Example III-2

Chlorination was performed in the same way as Example III-1 except that the chlorination was performed until the chlorine content of the chlorinated ethylene-propylene copolymer finally obtained as in Example III-1 was 40.1% by weight, thus producing a chlorinated ethylene-propylene copolymer (hereinafter referred to as "CLEPR III-B").

Example III-3

Instead of the EPR III-1 used in Example III-1, use was made of an ethylene-propylene opolymer with a propylene content of 24.5% by weight and a Mooney visccosity ($ML_{1+4}$, 100° C.) of 34 (MFR=4.8 g/10 min, crystallinity=3.2%, $\overline{M}_W/\overline{M}_N$=5.2, melting point 80° C.) and the first stage chlorination performed at the temperature range of 50° to 55° C. in the same way as in Example III-1. The chlorine content of the chlorinated substance obtained at this stage was 18.2%. The reaction system was then raised in temperature and, at a temperature range of 65° to 75° C., chlorination performed until a chlorine content of 31.3% by weight to produce the chlorinated ethylene-propylene copolymer (hereinafter referred to as "CLEPR III-C").

Comparative Example III-1

Instead of the EPR III-1 used in Example III-1, use was made of an ethylene-propylene copolymer with a propylene content of 31.8% by weight and a Mooney viscosity ($ML_{1+4}$, 100° C.) of 58.7 (MFR=8.2 g/10 min, crystallinity=2.5%, $\overline{M}_W/\overline{M}_N$=3.8, melting point 35° C.). Otherwise, the first stage chlorination and second stage chlorinatin were performed in the same way as in Example III-1. The chlorine content of the chlorinated ethylene-propylene copolymer obtained (hereinafter referred to as "CLEPR III-D") was 31.3% by weight.

Comparative Examples III-2 to III-5

Samples of the EPR III-1 used in Example III-1 were chlorinated at the temperature ranges shwon in Table III-1 until the chlorine contents shown in Table III-1 for the first stage chlorinations. The chlorinated substances obtained in this way were then immediately subjected to the chlorination in the temperature ranges shown in Table III-1 (i.e., second stage chlorination) to produce the chlorinated ethylene-propylene copolymers having the chlorine contents shown in Table III-1.

TABLE III-1

| Comp. Example No. | First stage Chlorination | | Second stage chlorination | |
|---|---|---|---|---|
| | Temp. range (°C.) | Chlorine content (% wt) | temperature range (°C.) | Chlorine content (1) (% wt) |
| III-2 | 100–104 | 18.2 | 105–115 | 31.3 |
| III-3 | 30–47 | 18.2 | 105–115 | 31.3 |
| III-4 | 30–47 | 18.3 | 125–130 | 30.6 |
| III-5 | 105–115 | 18.1 | 105–115 | 30.3 |

(1) Chlorine contents of chlorinated polyethylenes after second stage chlorination.

In the first stage chlorinatino of Comparative Examples III-1 and III-5, agglomeratin occurred and the chlorine distribution was nonuniform. Further, in the first stage chlorination of Comparative Example III-2, the chlorine distribution was nonuniform. Further, in Comparative Examples III-3 and III-4, in the second stage chlorinations, agglomeratin occurred and the chlorine distribution was nonuniform.

The physical properties of the chlorinated ethylene-propylene copolymers obtained by Examples III-1 to III-3 and Comparative Example III-2 were determined. The results are shown in Table III-2.

TABLE III-2

| Example or Comp. Example No. | 100% modulus (kg/cm²) | Tensile strength (kg/cm²) | Elongation at break (%) | Mooney viscosity | F.R. (g/10 min.) |
|---|---|---|---|---|---|
| Example III-1 | 8 | 25 | 1680 | 60 | 10.2 |
| Example III-2 | 15 | 62 | 750 | 88 | 4.6 |
| Comp. Example III-2 | 41 | 110 | 900 | 185 | 3.8 |
| Example III-3 | 5 | 20 | 2010 | 18 | 11.5 |

The types and physical properties of the chlorinated ethylene-propylene copolymers thiouric compounds, sulfur and sulfur donors, metal compounds, and other vulcanization accelerators used in the following examples and comparative examples are given below:

(A) Chlorinated Ethylene-Propylene Copolymers

As the chlorinated ethylene-propylene copolymers, use was made of a chlorinated ethylene-propylene copolymer (FR = 10.0 g/10 minues (hereinafter referred to as "CLEPR IV-A") having a Mooney viscosity (ML$_{1+4}$, 100° C.) of 42.0 obtained by charging in an aqueous suspension 10 kg of an ethylene-propylene copolymer having a propylene content of 22% by weight and Mooney viscosity (ML$_{1-4}$, 100° C.) of 115 (MFR = 1.0 g/10 minutes, crystallinity = 6.2%, $\overline{M}_W/\overline{M}_N$ = 6.1, melting point = 120° C.), (hereinafter referred to as "EPR IV-1"), agitating this at a temperature range of 50° to 90° C. and chlorinating it until a chlorine content of the copolymer of 18.2% by weight (i.e., first stage chlorination), then raising the temperature of the reaction system to 121° to 125° C. and, at that temperature range, suspending the introduction of chlorine and annealing for 30 minutes (i.e., second stage annealing), then cooling the reactin system and, at a temperature range of 95° to 118° C., chlorinating until a chlorine content of 30.4% by weight (i.e., third stage chlorination) or a chlorinated ethylene-propylene copolymer (FR = 11.0 g/10 minutes, hereinafter referred to as "CELPR IV-B") having a Mooney viscosity (ML$_{1+4}$, 100° C.) of 61 obtained by charging 10 kg of the afore-mentioned EPR IV-1 in the same way as above, agitating it and chlorinating at a temperature range of 50° to 90° C. until a chlorine content of said copolymer of 18.2% by weight (i.e., first stage chlorination), then raising the at that temperature range, chlorinating until a chlorine content of 27.1% by weight (i.e., second stage chlorination), then chlorinating at a temperature range of 118° to 120° C. until a chlorine content of 30.2% by weight (i.e., third stage chlorination).

(B) Thiourea Compounds

As thiourea compounds, use was made of diethylthiourea (hereinafter referred to as "EUR") and diethylenethiourea (hereinafter referred to as "2,2").

(C) Sulfur and Sulfur Donors

As the sulfur, use was made of powdered sulfur (particle size of 200 mesh pass (hereinafter referred to as "S") and, as the sulfur donor, use was made of dipentamethylenethiuram tetrasulfide (hereinafter referred to as "TRA").

(D) Metal Compounds

Further, as the metal compounds, use was made of magnesium oxide having an average particle size of 1.0 micron (hereinafter refered to as "MgO") and red lead having an average particle size of 1.5 microns (hereinafter referred to as "Pb$_3$O$_4$").

(E) Other Vulcanization Accelerators

Further, as the other vulcanization accelerators, use was made of tetramethylthiuram sulfide (hereinafter refered to as "TT").

Examples IV-1 to IV-7 and Comparative Examples IV-1 to IV-7

The formulated substances of the formulation amounts and types shown in Table IV-1 were kneaded at room temperature (about 20° C.) using open rolls for 20 minutes to form a sheet-like article. The obtained sheet-like articles were vulcanized using a compression molder at a temperature of 160° C. and pressure of 200 kg/cm² for 30 minutes to produce vulcanized articles. Tests were run on the vulcanized articles for tensile strength, elongation, hardness, and compression set. The results are shown in Table IV-2. Further, a vulcanization test was run on sheet-like articles obtained using open rolls.

The results are shown in FIG. 2.

TABLE IV-1

| Example or Comparative Example No. | Formulation amount (parts by weight) | | | | | | | | |
|---|---|---|---|---|---|---|---|---|---|
| | CLEPR (IV-A) | CLEPR (IV-B) | EUR | 2,2 | S | TRA | TT | MgO | $Pb_3O_4$ |
| Example | | | | | | | | | |
| IV-1 | 100 | 0 | 7.0 | 0 | 0.5 | 0 | 0 | 10 | 0 |
| IV-2 | 0 | 100 | 7.0 | 0 | 0.5 | 0 | 0 | 10 | 0 |
| IV-3 | 100 | 0 | 0 | 7.0 | 0.5 | 0 | 0 | 10 | 0 |
| IV-4 | 0 | 100 | 0 | 7.0 | 0.5 | 0 | 0 | 10 | 0 |
| IV-5 | 100 | 0 | 7.0 | 0 | 0.5 | 0 | 1.0 | 10 | 0 |
| IV-6 | 0 | 100 | 7.0 | 0 | 0 | 1.5 | 1.0 | 10 | 0 |
| IV-7 | 100 | 0 | 7.0 | 0 | 0.5 | 0 | 0 | 0 | 10 |
| Comp. Example | | | | | | | | | |
| IV-1 | 100 | 0 | 7.0 | 0 | 0 | 0 | 0 | 10 | 0 |
| IV-2 | 100 | 0 | 0 | 0 | 0.5 | 0 | 0 | 10 | 0 |
| IV-3 | 100 | 0 | 7.0 | 0 | 0.5 | 0 | 0 | 0 | 0 |
| IV-4 | 100 | 0 | 0 | 0 | 0.5 | 0 | 1.0 | 10 | 0 |
| IV-5 | 0 | 100 | 7.0 | 0 | 0.5 | 0 | 0 | 0 | 0 |
| IV-6 | 0 | 100 | 0 | 0 | 0.5 | 0 | 1.0 | 0 | 10 |
| IV-7 | 100 | 0 | 7.0 | 0 | 0.5 | 0 | 0 | 30 | 0 |

Comparative Example IV-8

Instead of the CLEPR IV-A used in Example IV-1, use was made of a chlorinated polyethylene having a Mooney viscosity ($MS_{1+4}$, 100° C.) of 70 and a chlorine content of 30.3% by weight obtained by chlorinating by the aqueous suspension method a high density polyethylene having a molecular weight of about 200,000 and a density of 0.950 g/cm³. Otherwise, the same procedures were performed as in Example IV-1 for kneading to form sheets. The obtained sheet was vulcanized in the same way as Example IV-1 to produce the vulcanized article. The obtained vulcanized article was subjected to tests on the tensile strength, elongation, hardness, and compression set. The results are shown in Table IV-2. Further, a vulcanization test was performed in the same way as Example IV-1. The results are shown in FIG. 2.

Note that Comparative Examples IV-3 and IV-5 showed dehydrochlorination during the vulcanization and could not form sheet-like vulcanized articles.

The cross-linking curves of the compotions obtained by Examples IV-1 and IV-5 and Comaprative Examples IV-1 and IV-8 (kneaded articles) are shown in FIG. 2 as a-2, b-2, c-2, and d-2.

From the results of the above examples and comparative examples, it is clear that the vulcanizable chlorination compositions obtained by the present invention are not only superior in tensile strenght ($T_B$) and compression set, but also draw superior vulcanizatin curves even when judged from rheometer curves.

TABLE IV-2

| Example or Comparative Example No. | $T_B$ (kg/cm²) | $E_B$ (%) | Hardness | Compression Set (%) |
|---|---|---|---|---|
| Example | | | | |
| IV-1 | 200 | 500 | 59 | 31.0 |
| IV-2 | 212 | 500 | 57 | 30.8 |
| IV-3 | 220 | 520 | 58 | 33.4 |
| IV-4 | 222 | 525 | 56 | 31.6 |
| IV-5 | 212 | 535 | 56 | 30.0 |
| IV-6 | 210 | 530 | 57 | 31.4 |
| IV-7 | 208 | 510 | 56 | 34.2 |
| Comp. Example | | | | |
| IV-1 | 142 | 720 | 55 | 62.4 |
| IV-2 | 102 | 920 | 56 | 92.4 |
| IV-4 | 124 | 880 | 55 | 79.2 |
| IV-6 | 123 | 890 | 56 | 80.2 |
| IV-7 | 184 | 500 | 69 | 41.0 |
| IV-8 | 232 | 590 | 85 | 58.2 |

The types and physical properties of the chlorinated ethylene-propylene copolymers thiourea compounds, dicarbamates, sulfur and sulfur donors, metal compounds, and other vulcanization accelerators used in the following Examples and Comparative Examples are given below:

(A) Chlorinated Ethylene-propylene Copolymers

As the chlorinated ethylene-propylene copolymers, use was made of a chlorinated ethylene-propylene copolymer (FR = 10.0 g/10 minutes, hereinafter referred to as "CLEPR V-A") having a Mooney viscosity 100° C.) of 42.0 obtained by charging in an aqueous suspension 10 kg of an ethylene-propylene copolymer viscosity ($ML_{1+4}$, 100° C.) of 115 (MFR = 1.0 g/10 minutes, crystallinity = 5.1%, $\overline{M}_W/\overline{M}_N = 5.0$, melting point = 120° C., hereinafter referred to as "EPR V-1"), agitating this and chlorinating it at a temperature range of 50° to 90° C. until a chlorine content of the copolymer of 18.2% by weight (i.e., first stage chlorination), then raising the temperature of the reaction system to 121° to 125° C. and, at that temperature range, suspending the introduction of chlorine and annealing for 30 minutes (i.e., second stage annealing), then cooling the reaction system and, at a temperature range of 95° to 118° C., chlorinating until a chlorine content of 30.4% by weight (i.e., third stage chlorniation) or a chlorinated ethylene-propylene copolymer (FR = 11.0 g/10 minutes, hereinafter referred to as "CEPR V-B") having a Mooney viscosity ($ML_{1+4}$, 100° C.) of 61 obtained by charging 10 kg of the afore-mentioned EPR V-1 in the same way as above, agitating it and chlorinating at a temperature range of 50° to 90° C. until a chlorine content of said copolymer of 18.2% by weight (i.e., first stage chlorination), then raising the temperature of the reaciton system to 105° to 115° C. and, at that temperature range, chlorinating until a chlorine content of 27.1% by weight (i.e., second stage chlorination), then chlorinating at a temperature range of 118° to 120° C. until a chlorine content of 30.2% by weight (i.e., third stage chlorination).

(B) Thiourea Compounds

As thiourea compounds, use was made of diethylthiourea (hereinafter referred to as "EUR") and diethylenethiourea (hereinafter referred to as "2,2").

(C) Dicarbamates

As the dicarbamates, use was made of sodium pentamethylene carbamate (hereinafter referred to as "PMTC").

(D) Sulfur and Sulfur Donors

As the sulfur, use was made of powdered sulfur (particle size of 200 mesh pass, hereinafter referred to as "S") and, as the sulfur donor, use was made of dipentamethylenethiuram tetrasulfide (hereinafter referred to as "TRA").

(E) Metal Compounds

Further, as the metal compounds, use was made of magnesium oxide having an average particle size of 1.0 micron (hereinafter referred to as "MgO") and red lead having an average particle size of 1.5 microns (hereinafter referred to as "$Pb_3O_4$").

(F) Other Vulcanization Accelerators

Further, as the other vulcanization accelerators, use was made of tetramethylthiuram disulfide (hereinafter referred to as "TT").

Examples V-1 to V-7 and Comparative Examples V-1 to V-8

The formulated substances of the formulation amounts and types shown in Table V-1 were kneaded at room temperature (about 20° C.) using open rolls for 20 minutes to form sheet-like articles. The obtained sheet-like articles were vulcanized using a compression molder at a temperature of 160° C. and pressure of 200 kg/cm² for 30 minutes to produce vulcanized articles. Tests were run on the vulcanized articles for tensile strength, elongation, hardness, and compression set. The results are shown in Table V-2. Further, a vulcanization test was run on sheet-like articles obtained using open rolls. The results are shown in FIG. 3.

TABLE V-2

| Example or Comparative Example No. | $T_B$ (kg/cm²) | $E_B$ (%) | Hardness | Compression Set (%) |
|---|---|---|---|---|
| Example | | | | |
| V-1 | 190 | 390 | 60 | 30.0 |
| V-2 | 202 | 360 | 59 | 30.1 |
| V-3 | 180 | 400 | 58 | 31.2 |
| V-4 | 192 | 395 | 59 | 30.8 |
| V-5 | 200 | 395 | 59 | 31.0 |
| V-6 | 192 | 393 | 59 | 30.4 |
| V-7 | 195 | 395 | 60 | 31.0 |
| Comp. Example | | | | |
| V-1 | 200 | 500 | 59 | 31.0 |
| V-2 | 152 | 660 | 56 | 52.4 |
| V-3 | 141 | 780 | 56 | 63.4 |
| V-5 | 155 | 680 | 56 | 72.4 |
| V-7 | 145 | 760 | 57 | 70.0 |
| V-8 | 220 | 390 | 65 | 38.0 |
| V-9 | 190 | 400 | 90 | 35.2 |

Comparative Example V-9

Instead of the CLEPR V-A used in Example V-1, use was made of a chlorinated polyethylene having a Mooney viscosity ($MS_{1+4}$, 100° C.) of 70 and a chlorine content of 30.3% by weight obtained by chlorinating by the aqueous suspension method a high density polyethylene having a molecular weight of about 200,000 and a density of 0.950 g/cm³. Otherwise, the same procedures were performed as in Example V-1 for keading to form a sheet. The obtained sheet was vulcanized in the same way as Example V-1 to produce the vulcanized article. The obtained vulcanized article was subjected to tests on the tensile strength, elongation, hardness, and compression set. The results are shown in Table V-2. Further, a vulcanization test was performed in the same way as Example V-1. The results are shown in FIG. 3.

Comparative Examples V-4 and V-6 showed dehydrochlorination during the vulcanization and could not form sheet-like vulcanized articles.

The cross-linking curves of the compositions by Examples V-1 and V-2 and Comparative Examples V-1 and V-9 (kneaded articles) are shown in FIG. 3 as a-3, b-3, c-3, and d-3.

The types and physical properties of the chlorniated ethylene-propylene copolymers, thiourea compounds, mercaptotriazine compounds, sulfur and sulfur donors,

TABLE V-1

| Example or Comparative Example No. | Formulation amount (parts by weight) | | | | | | | | | |
|---|---|---|---|---|---|---|---|---|---|---|
| | CLEPR (V-A) | CLEPR (V-B) | EUR | 22 | PMTC | S | TRA | TT | MgO | $Pb_3O_4$ |
| Example | | | | | | | | | | |
| V-1 | 100 | 0 | 7.0 | 0 | 3.0 | 0.5 | 0 | 0 | 10 | 0 |
| V-2 | 100 | 0 | 7.0 | 0 | 3.0 | 0.5 | 0 | 1.0 | 10 | 0 |
| V-3 | 100 | 0 | 7.0 | 0 | 3.0 | 0.5 | 0 | 0 | 0 | 10 |
| V-4 | 100 | 0 | 0 | 7.0 | 3.0 | 0.5 | 0 | 0 | 10 | 0 |
| V-5 | 100 | 0 | 7.0 | 0 | 3.0 | 0 | 1.5 | 1.0 | 10 | 0 |
| V-6 | 0 | 100 | 7.0 | 0 | 3.0 | 0.5 | 0 | 0 | 10 | 0 |
| V-7 | 0 | 100 | 0 | 7.0 | 3.0 | 0.5 | 0 | 0 | 10 | 0 |
| Comp. Example | | | | | | | | | | |
| V-1 | 100 | 0 | 7.0 | 0 | 0 | 0.5 | 0 | 0 | 10 | 0 |
| V-2 | 100 | 0 | 7.0 | 0 | 3.0 | 0 | 0 | 0 | 10 | 0 |
| V-3 | 100 | 0 | 0 | 0 | 3.0 | 0.5 | 0 | 0 | 10 | 0 |
| V-4 | 100 | 0 | 7.0 | 0 | 3.0 | 0.5 | 0 | 0 | 0 | 0 |
| V-5 | 100 | 0 | 7.0 | 0 | 3.0 | 0 | 0 | 1.0 | 10 | 0 |
| V-6 | 0 | 100 | 7.0 | 0 | 3.0 | 0.5 | 0 | 0 | 0 | 0 |
| V-7 | 0 | 100 | 0 | 7.0 | 3.0 | 0 | 0 | 0 | 10 | 0 |
| V-8 | 0 | 100 | 7.0 | 0 | 3.0 | 0.5 | 0 | 0 | 30 | 0 | metal compounds, and other vulcanization accelerators used in the following Examples and Comparative Examples are given below:

(A) Chlorinated Ethylene-Propylene Copolymers

As the chlorinated ethylene-propylene copolymers, use was made of a chlorinated ethylene-propylene copolymer (FR=10.0 g/10 minutes, hereinafter referred to as "CLEPR VI-A") having a Mooney viscosity (ML$_{1+4}$, 100° C.) of 42.0 obtained by charging in an aqueous suspension 10 kg of an ethylene-propylene copolymer having a propylene content of 22% by weight and Mooney viscosity (ML$_{1+4}$, 100° C.) of 115 (MFR=1.0 g/10 minutes, crystallinity=5.1%, $\overline{M}_W/\overline{M}_N$=5.0, melting point=120° C., hereinafter referred to as "EPR VI-1"), agitating this and chlorinating it at a temperature range of 50° to 90° C. until a chlorine content of the copolymer of 18.2% by weight (i.e., first stage chlorination), then raising the temperature of the reaction system to 121° to 125° C. and, at that temperature range, suspending the introduction of chlorine and annealing for 30 minutes (i.e., second stage annealing), then cooling the reaction system and, at a temperature range of 95° to 118° C., chlorinating until a chlorine content of 30.4% by weight (i.e., third stage chlorination) or a chlorinated ethylene-propylene copolymer (FR=11.0 g/10 minutes, hereinafter referred to as "CLEPR IV-B") having a Mooney viscosity (ML$_{1+4}$, 100° C.) of 61 obtained by charging 10 kg of the afore-mentioned EPR VI-1 in the same way as above, agitating it and chlorinating at a temperature range of 50° to 90° C. until a chlorine content of said copolymer of 18.2% by weight (i.e., first stage chlorination), then raising the temperature of the reaction system to 105° to 115° C. and, at that temperature range, chlorinating until a chlorine content of 27.1% by weight (i.e., second stage chlorination), then chlorinating at a temperature range of 118° to 120° C. until a chlorine content of 30.2% by weight (i.e., third stage chlorination).

(B) Thiourea Compounds

As thiourea compounds, use was made of diethylthiourea (hereinafter referred to as "EUR") and diethylenethiourea (hereinafter referred to as "2,2").

(C) Mercaptotriazine Compounds

As the mercaptotriazine compounds, use was made of 1,3,5-mercapto-S-triazine (hereinafter referred to as "azine (1)").

(D) Sulfur and Sulfur Donors

As the sulfur, use was made of powdered sulfur (particle size of 200 mesh pass, hereinafter referred to as "S") and, as dipentamethylenethiuram tetrasulfide (hereinafter referred to as "TRA")..

(E) Metal Compounds

Further, as the metal compounds, use was made of magnesium oxide having an average particle size of 1.0 micron (hereinafter referred to as "MgO") and red lead having an average particle size of 1.5 microns (hereinafter referred to as "Pb$_3$O$_4$")

(F) Other Vulcanization Accelerators

Further, as the other vulcanization accelerators, use was made of tetramethylthiuram disulfide (hereinafter referred to as "TT").

Examples VI-1 to VI-7 and Comparative Examples VI-1 to VI-10

The formulated substances of the formulation amounts and types shown in Table VI-1 were kneaded at room temperature (about 20° C.) using open rolls for 20 minutes to form sheet-like articles. The obtained sheet-like articles were vulcanized using a compression molder at a temperature of 160° C. and pressure of 200 kg/cm$^2$ for 30 minutes to produce vulcanized articles. Tests were run on the vulcanized articles for tensile strength, elongation, hardness, and compression set. The results are shown in Table VI-2. Further, a vulcanization test was run on sheet-like articles obtained using open rolls. The results are shown in FIG. 4.

TABLE VI-1

| Example or Comparative Example No. | Formulation amount (parts by weight) | | | | | | | | |
|---|---|---|---|---|---|---|---|---|---|
| | CLEPR (VI-A) | CLEPR (VI-B) | EUR | 2,2 | Azine (1) | S | TRA | TT | MgO | Pb$_3$O$_4$ |
| Example | | | | | | | | | | |
| VI-1 | 100 | 0 | 4.0 | 0 | 2.0 | 0.5 | 0 | 0 | 10 | 0 |
| VI-2 | 100 | 0 | 0 | 4.0 | 2.0 | 0.5 | 0 | 0 | 10 | 0 |
| VI-3 | 100 | 0 | 4.0 | 0 | 2.0 | 0.5 | 0 | 1.0 | 10 | 0 |
| VI-4 | 100 | 0 | 4.0 | 0 | 2.0 | 0 | 1.5 | 1.0 | 10 | 0 |
| VI-5 | 100 | 0 | 4.0 | 0 | 2.0 | 0.5 | 0 | 0 | 0 | 10 |
| VI-6 | 0 | 100 | 4.0 | 0 | 2.0 | 0 | 1.5 | 1.0 | 10 | 0 |
| VI-7 | 0 | 100 | 5.0 | 0 | 2.0 | 0.5 | 0 | 0 | 10 | 0 |
| Comp. Example | | | | | | | | | | |
| VI-1 | 100 | 0 | 7.0 | 0 | 0 | 0.5 | 0 | 0 | 10 | 0 |
| VI-2 | 100 | 0 | 4.0 | 0 | 0 | 0.5 | 0 | 0 | 10 | 0 |
| VI-3 | 100 | 0 | 4.0 | 0 | 2.0 | 0 | 0 | 0 | 10 | 0 |
| VI-4 | 100 | 0 | 4.0 | 0 | 2.0 | 0 | 0 | 1.0 | 10 | 0 |
| VI-5 | 100 | 0 | 0 | 0 | 2.0 | 0.5 | 0 | 0 | 10 | 0 |
| VI-6 | 100 | 0 | 4.0 | 0 | 2.0 | 0.5 | 0 | 0 | 0 | 0 |
| VI-7 | 100 | 0 | 7.0 | 0 | 0 | 0 | 0 | 1.0 | 10 | 0 |
| VI-8 | 0 | 100 | 4.0 | 0 | 2.0 | 0.5 | 0 | 0 | 0 | 0 |
| VI-9 | 0 | 100 | 0 | 0 | 2.0 | 0.5 | 0 | 1.0 | 10 | 0 |
| VI-10 | 0 | 100 | 7.0 | 0 | 0 | 0.5 | 0 | 0 | 10 | 0 |

TABLE VI-2

| Example or Comparative Example No. | T$_B$ (kg/cm$^2$) | E$_B$ (%) | Hardness | Compression Set (%) |
|---|---|---|---|---|
| Example | | | | |
| VI-1 | 192 | 350 | 63 | 28.5 |
| VI-2 | 190 | 360 | 62 | 27.0 |

TABLE VI-2-continued

| Example or Comparative Example No. | $T_B$ (kg/cm$^2$) | $E_B$ (%) | Hardness | Compression Set (%) |
|---|---|---|---|---|
| VI-3 | 206 | 330 | 63 | 27.5 |
| VI-4 | 191 | 320 | 62 | 25.4 |
| VI-5 | 196 | 350 | 61 | 28.0 |
| VI-6 | 191 | 320 | 62 | 24.8 |
| VI-7 | 197 | 320 | 61 | 25.4 |
| Comp. Example | | | | |
| VI-1 | 200 | 500 | 59 | 31.0 |
| VI-2 | 196 | 620 | 58 | 52.0 |
| VI-3 | 162 | 690 | 59 | 53.6 |
| VI-4 | 163 | 695 | 58 | 51.6 |
| VI-5 | 162 | 780 | 58 | 62.5 |
| VI-7 | 150 | 820 | 58 | 82.4 |
| VI-9 | 152 | 890 | 59 | 88.6 |
| VI-10 | 200 | 500 | 59 | 31.2 |
| VI-11 | 240 | 420 | 87 | 30.6 |

Comparative Example VI-11

Instead of the CLEPR VI-A used in Example VI-1, use was made of a chlorinated polyethylene having a Mooney viscosity (MS$_{1+4}$, 100° C.) of 70 and a chlorine content of 30.3% by weight obtained by chlorinating by the aqueous suspension method a high density polyethylene having a molecular weight of about 200,000 and a density of 0.950 g/cm$^3$. Otherwise, the same procedures were performed as in Example VI-1 for kneading to form a sheet. The obtained sheet was vulcanized in the same way as Example VI-1 to produce the vulcanized article. The obtained vulcanized article was subjected to tests on the tensile strength, elongation, hardness, and compression set. The results are shown in Table VI-2. Further, a vulcanization test was performed in the same way as Example VI-1. The results are shown in FIG. 4.

Comparative Examples VI-6 and VI-8 showed dehydrochlorination during the vulcanization and could not form sheet-like vulcanized articles.

The cross-linking curves of the compositions obtained by Examples VI-1 and VI-3 and Comparative Examples VI-1 and VI-11 (kneaded articles) are shown in FIG. 4 as a-4, b-4, c-4, and d-4.

The types and physical properties of the chlorinated ethylene-propylene copolymers, organic peroxides, cross-linking assistants and mercaptotriazine compounds used in the following Examples and Comparative Examples are given below:

(A) Chlorinated Ethylene-Propylene Copolymer

As the chlorinated ethylene-propylene copolymers, use was made of a chlorinated ethylene-propylene copolymer (FR=10.0 g/10 minutes, hereinafter referred to as "CLEPR VII-A") having a Mooney viscosity (ML$_{1+4}$, 100° C.) of 42.0 obtained by charging in an aqueous suspension 10 kg of an ethylene-propylene copolymer having a propylene content of 22% by weight and Mooney viscosity (ML$_{1+4}$, 100° C.) of 115 (MFR=1.0 g/10 minutes, crystallinity=5.1%, $\overline{M}_W/\overline{M}_N=5.0$, melting point=120° C., hereinafter referred to as "EPR VII-1"), agitating this and chlorinating it at a temperature range of 50° to 90° C. until a chlorine content of the copolymer of 18.2% by weight (i.e., first stage chlorination), then raising the temperature of the reaction system to 121° to 125° C. and, at that temperature range, suspending the introduction of chlorine and annealing for 30 minutes (i.e., second stage annealing), then cooling the reaction system and, at a temperature range of 95° to 118° C., chlorinating until a chlorine content of 30.4% by weight (i.e., third stage chlorination) or a chlorinated ethylene-propylene copolymer (FR=11.0 g/10 minutes, hereinafter referred to as "CLEPR VII-B") having a Mooney viscosity (ML$_{1+4}$, 100° C.) of 61 obtained by charging 10 kg of the afore-mentioned EPR VII-1 in the same way as above, agitating it and chlorinating at a temperature range of 50° to 90° C. until a chlorine content of said copolymer of 18.2% by weight (i.e., first stage chlorination), then raising the temperature of the reaction system to 105° to 115° C. and, at that temperature range, chlorinating until a chlorine content of 27.1% by weight (i.e., second stage chlorination), then chlorinating at a temperature range of 118° to 120° C. until a chlorine content of 30.2% by weight (i.e., third stage chlorination).

(B) Organic Peroxide

As organic peroxides, use was made of dicumylperoxide (hereinafter referred to as "DCP").

(C) Cross-Linking Assistants

As the cross-linking assistant, use was made of triallylisocyanulate (hereinafter referred to as "TAIC").

(D) Mercaptotriazine Compounds

As the mercaptotriazine compounds, use was made of 1,3,5-mercapto-S-triazine (hereinafter referred to as "azine (1)").

(E) Metal Compounds

Further, as the metal compounds, use was made of magnesium oxide having an average particle size of 1.0 micron (hereinafter referred to as "MgO") and red lead having an average particle size of 1.5 microns (hereinafter referred to as "Pb$_3$O$_4$").

Examples VII-1 to VII-6 and Comparative Examples VII-1 to VII-8

The formulated substances of the formulation amounts and types shown in Table VII-1 were kneaded at room temperature (about 20° C.) using open rolls for 20 minutes to form sheet-like articles. The obtained sheet-like articles were cross-linked using a compression molder at a temperature of 175° C. and pressure of 200 kg/cm$^2$ for 10 minutes to produce cross-linked articles. Tests were run on the cross-linked articles for tensile strength, elongation, hardness, compression set, heat resistance, and tear strength. The results are shown in Table VII-2. Further, a cross-linking test was run on sheet-like articles obtained using open rolls. The results are shown in FIG. 5.

TABLE VII-1

| Example or Comparative Example No. | Formulation amount (parts by weight) | | | | | | |
|---|---|---|---|---|---|---|---|
| | CLEPR (VII-A) | CLEPR (VII-B) | TAIC | DCP | Azine | MgO | Pb$_3$O$_4$ |
| Example | | | | | | | |
| VII-1 | 100 | 0 | 3.0 | 2.0 | 0 | 10 | 0 |

TABLE VII-1-continued

| Example or Comparative Example No. | Formulation amount (parts by weight) | | | | | | |
|---|---|---|---|---|---|---|---|
| | CLEPR (VII-A) | CLEPR (VII-B) | TAIC | DCP | Azine | MgO | Pb₃O₄ |
| VII-2 | 100 | 0 | 3.0 | 2.0 | 0.5 | 10 | 0 |
| VII-3 | 100 | 0 | 3.0 | 2.0 | 0 | 0 | 10 |
| VII-4 | 0 | 100 | 3.0 | 2.0 | 0 | 10 | 0 |
| VII-5 | 0 | 100 | 3.0 | 2.0 | 0.5 | 10 | 0 |
| VII-6 | 0 | 100 | 3.0 | 2.0 | 0.5 | 0 | 10 |
| Comp. Example | | | | | | | |
| VII-1 | 100 | 0 | 3.0 | 0 | 0 | 10 | 0 |
| VII-2 | 100 | 0 | 0 | 2.0 | 0 | 10 | 0 |
| VII-3 | 100 | 0 | 3.0 | 0 | 0 | 0 | 10 |
| VII-4 | 100 | 0 | 3.0 | 2.0 | 0 | 0 | 0 |
| VII-5 | 0 | 100 | 3.0 | 2.0 | 0 | 0 | 0 |
| VII-6 | 0 | 100 | 3.0 | 0 | 0 | 10 | 0 |
| VII-7 | 0 | 100 | 3.0 | 0 | 0 | 0 | 10 |
| VII-8 | 0 | 100 | 0 | 2.0 | 0 | 10 | 0 |

TABLE VII-2

| Example Comparative Example No. | $T_B$ (kg/cm²) | $E_B$ | Hardness | Compression set (%) | Tear strength (kg/cm) | Heat resistance test (130° C., 70 h) | | Heat resistance test (130° C., 120 h) | |
|---|---|---|---|---|---|---|---|---|---|
| | | | | | | $T_B$ remaining (%) | $E_B$ remaining (%) | $T_B$ remaining (%) | $E_B$ remaining (%) |
| Example | | | | | | | | | |
| VII-1 | 135 | 250 | 60 | 29.4 | 26.0 | ±0 | −10 | −2 | −12 |
| VII-2 | 125 | 270 | 59 | 30.4 | 32.0 | +2 | −11 | −3 | −15 |
| VII-3 | 140 | 260 | 59 | 29.5 | 26.5 | +2 | −11 | −2 | −13 |
| VII-4 | 135 | 250 | 60 | 28.4 | 25.5 | ±0 | −10 | −3 | −13 |
| VII-5 | 130 | 275 | 58 | 31.0 | 31.0 | +5 | −10 | −2 | −14 |
| VII-6 | 140 | 275 | 58 | 31.5 | 30.5 | +2 | −11 | −3 | −14 |
| Comp. Example | | | | | | | | | |
| VII-1 | 62 | 920 | 52 | 92.4 | 30.5 | −65 | −82 | −72 | −92 |
| VII-2 | 92 | 720 | 53 | 81.5 | 30.5 | −55 | −70 | −68 | −81 |
| VII-3 | 62 | 930 | 52 | 95.4 | 31.0 | −70 | −81 | −75 | −89 |
| VII-6 | 61 | 935 | 51 | 92.4 | 31.5 | −62 | −88 | −71 | −89 |
| VII-7 | 62 | 940 | 51 | 91.3 | 30.6 | −70 | −82 | −71 | −85 |
| VII-8 | 93 | 715 | 52 | 80.5 | 31.0 | −50 | −65 | −62 | −78 |
| VII-9 | 145 | 210 | 72 | 35.4 | 24.0 | +12 | −32 | −15 | −38 |

Comparative Example VII-9

Instead of the CLEPR (VII-A) used in Example VII-1, use was made of a chlorinated polyethylene having a Mooney viscosity (MS₁₊₄, 100° C.) of 70 and a chlorine content of 30.3% by weight obtained by chlorinating by the aqueous suspension method a high density polyethylene having a molecular weight of about 200,000 and a density of 0.950 g/cm³. Otherwise, the same procedures were performed as in Example VII-1 for kneading to form a sheet. The obtained sheet was cross-linked in the same way as Example VII-1 to produce the cross-linked article. The obtained cross-linked article was subjected to tests on the tensile strength, elongation, hardness, compression set, heat resistance, and tear strength. The results are shown in Table VII-2. Further, a vulcanization test was performed in the same way as Example VII-1. The results are shown in FIG. 5.

Note that Comparative Examples VII-4 and VII-5 showed dehydrochlorination during the cross-linking and could not form sheet-like cross-linked articles.

The cross-linking curves of the compositons obtained by Examples VII-1 and VII-4 and Comparative Examples VII-1 and VII-9 (kneaded articles) are shown in FIG. 5 as a-5, b-5, c-5, and d-5.

From the results of the above Examples and Comparative Examples, it is clear that the cross-linked chlorination compositions obtained by the present invention are not only superior in tensile strength ($T_B$), compression set, and heat resistance, but also draw superior cross-linking curves even when judged from rheometer curves.

We claim:

1. A method for producing a chlorinated ethylene-propylene copolymer comprising contacting a starting ethylene-propylene copolymer, wherein the propylene content is 20 to 38% by weight, the melt flow index is 0.01 to 5.0 g/10 minutes, the melting peak as measured by differential scan calorimetry (DSC) is 80° C. or more, the crystallinity as measured by X-rays is 3 to 45%, the index $\overline{M}_W/\overline{M}_N$ of the distribution of molecular weight, determined by gel permeation chromatography (GPC), is greater than 4, and the Mooney viscosity (ML₁₊₄, 100° C.) is 10 to 180, with chlorine gas in an aqueous suspension, to produce a chlorinated ethylene-propylene copolymer having a chlorine content of 20 to 45% by weight and a Mooney viscosity (ML₁₊₄, 100° C.) of 10 to 150, wherein at a first stage, 20 to 60% of the total chlorination amount is chlorinated at a temperature at least 25° C. below the melting point of the ethylene-propylene copolymer but higher than 50° C., at a second stage, at least 30% of the remaining chlorination amount is chlorinated at a temperature 10° C. or more higher than the chlorination temperature at the first stage but at a temperature 5° to 15° C. lower than the melting point of said ethylene-propylene copolymer, with 60 to 90% of the total chlorination amount chlorinated up to that Stage, and at a third stage, at least 10% of the total chlorination amount is chlorinated at a temperature less than the melting point of the ethylene-propylene copolymer but not less than a temperature of the melting point minus 2° C.

2. A method for producing a chlorinated ethylene-propylene copolymer comprising contacting a starting ethylene-propylene copolymer, wherein the propylene content is 20 to 38% by weight, the melt flow index is 0.01 is 5.0 g/10 minutes, the melting peak as measured by differential scan calorimetry (DSC) is 80° C. or more, the crystallinity as measured by X-rays is 3% to 6.2%, the index $\overline{M}_W/\overline{M}_N$ of the distribution of molecular weight, determined by gel permeation chromatography (GPC), is greater than 4 but not more than 8, and the Mooney viscosity ($ML_{1+4}$, 100° C.) is 10 to 150, with chlorine gas in an aqueous suspension, to produce a chlorinated ethylene-propylene copolymer having a chlorine content of 20 to 45% by weight, a Mooney viscosity ($ML_{1+4}$, 100° C.) of 10 to 100 and a melt flow index of 1 to 100 g.10 minutes, wherein at a first stage, 20 to 60% of the total chlorination amount is chlorinated at a temperature at least 25° C. below the melting point of the ethylene-propylene copolymer but higher than 50° C., at a second stage, the temperature is raised to 1° to 7° C. higher than the melting point of the ethylene-propylene copolymer, at which temperature the process comprises annealing the ethylene propylene copolymer for 10 to 60 minutes without introduction of chlorine gas, and at a third stage, at a temperature 2° to 25° C. lower than the melting point of the ethylene-propylene copolymer, performing the remaining chlorination.

3. A method as claimed in claim 1, wherein the melt flow index of the starting copolymer is 0.05 to 5.0 g/10 minutes.

4. A method as claimed in claim 1, wherein the melting peak of the starting copolymer is 85° to 125° C.

5. A method as claimed in claim 1, wherein the index $\overline{M}_W/\overline{M}_N$ of the starting copolymer is greater than 4 but not greater than 8.

6. A method as claimed in claim 1, wherein the Mooney viscosity ($ML_{1+4}$, 100° C.) of the starting copolymer is 10 to 150.

7. A method as claimed in claim 1, wherein the chlorine content of the chlorinated copolymer at the first stage is 8 to 20% by weight.

* * * * *